United States Patent
Kondou et al.

(10) Patent No.: US 7,599,319 B2
(45) Date of Patent: Oct. 6, 2009

(54) RADIO COMMUNICATIONS SYSTEM AND CONTROL METHOD THEREFOR

(75) Inventors: Daisuke Kondou, Tokyo (JP); Motoya Iwasaki, Tokyo (JP); Hisashi Kawabata, Tokyo (JP); Osami Nishimura, Tokyo (JP); Yukio Haseba, Tokyo (JP); Emiko Sakuma, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 11/265,308

(22) Filed: Nov. 3, 2005

(65) Prior Publication Data

US 2006/0092870 A1 May 4, 2006

(30) Foreign Application Priority Data

Nov. 4, 2004 (JP) ............................. 2004-320339

(51) Int. Cl.
*H04B 7/185* (2006.01)
*H04B 15/00* (2006.01)

(52) U.S. Cl. .................. 370/318; 455/522; 455/127.1
(58) Field of Classification Search ................ 370/318; 455/522, 127.1–127.5
See application file for complete search history.

(56) References Cited

U.S. PATENT DOCUMENTS

| 6,950,671 | B2 | 9/2005 | Hamabe | |
|---|---|---|---|---|
| 7,167,719 | B2 | 1/2007 | Agin | |
| 2002/0173330 | A1* | 11/2002 | Kojima et al. | 455/522 |
| 2002/0187801 | A1* | 12/2002 | Vanghi | 455/522 |
| 2003/0036403 | A1* | 2/2003 | Shiu et al. | 455/522 |
| 2003/0073409 | A1 | 4/2003 | Nobukiyo et al. | |
| 2004/0106425 | A1* | 6/2004 | Koo et al. | 455/522 |
| 2004/0203774 | A1 | 10/2004 | Nagato et al. | |
| 2006/0068826 | A1* | 3/2006 | Leonard | 455/522 |

FOREIGN PATENT DOCUMENTS

| EP | 1 067 704 A2 | 1/2001 |
|---|---|---|
| EP | 1 967 704 A2 | 1/2001 |
| EP | 1 207 629 A2 | 5/2002 |
| EP | 1 235 454 A2 | 8/2002 |
| JP | 8-191418 A | 7/1996 |
| JP | 2002-325063 A | 11/2002 |
| JP | 2003-199173 A | 7/2003 |
| JP | 2003-309875 A | 10/2003 |

OTHER PUBLICATIONS

3GPP TR 25.896, "3rd Generation Partnership Project; Technical Specification Group Radio Access Network; Feasibility Study for Enhanced Uplink for UTRA FDD (Release 6)," V6.0.0 (Mar. 2004), pp. 1-179.
3GPP TS 25.214, 3rd Generation Partnership Project; Technical Specification Group Radio Access Network; Physical layer procedures (FDD) (Release 1999), V3.12.0 (Mar. 2003) pp. 1-52.
3GPP TS 25.211, 3rd Generation Partnerhsip Project; Technical Specification Group Radio Access Network; Phydical channesl and mapping of transport channels onto physical channels (FDD) (Release 1999), V3.12.0 (Sep. 2002), pp. 1-46.

* cited by examiner

*Primary Examiner*—Lester Kincaid
*Assistant Examiner*—Daniel Lai
(74) *Attorney, Agent, or Firm*—Foley & Lardner LLP

(57) ABSTRACT

A radio base station which receives a first and a second communication channel from a radio communications device comprises a control circuit for detecting the reception quality of the first communication channel, conducting an inner-loop power control for controlling transmission power of the first communication channel from the radio communications device based on the reception quality and an inner-loop power control target value, and adding a power control offset to the inner-loop power control target value before starting a communication through the second communication channel.

37 Claims, 18 Drawing Sheets

RADIO COMMUNICATIONS SYSTEM AND CONTROL METHOD THEREFOR

BACKGROUND OF THE INVENTION

1. Field of the Invention

The present invention relates to transmission power control for a communication channel in a radio communications system.

2. Description of the Related Art

In radio communications systems, considerations have been made on the transmission of a variety of contents including video clips, multimedia data, games, streaming videos and the like. Commercialization of such a transmission system entails a reduction in delay in uplink communications, an enlargement of a coverage area, and an improvement in throughput in the radio communications systems. The introduction of communications on uplink high-rate communication channels have been under investigation as a communications scheme suitable for such systems. Such a communication scheme is defined in a standard such as 3GPP TR 25.896 V6.0 by 3GPP ($3^{rd}$ Generation Partnership Project).

Technologies have been desired for realizing a service using uplink high-rate channels, as mentioned above, without affecting existing communications and services on data communication channels.

The transmission power on an uplink channel in a radio communication system is controlled in accordance with an outer-loop power control method and an inner-loop control method. These transmission power controls are defined, for example, in 3GPP TS 25.214 V3.12.0. Technologies have been desired for realizing services using uplink high-rate channels without affecting existing communications and services through data communication channels while utilizing existing systems which are operated under such outer-loop power control or inner-loop power control.

A change in a propagation path condition caused by a communication channel initiated at a later time, such as the uplink high-rate channel, may affect the reception quality of other existing uplink channels which have already been in service. For example, as shown in FIG. 1, the start of a later communication through a communication channel can cause an increase in interfering power to suddenly degrade the reception quality (for example, SIR: Signal to Interference Ratio) of an earlier communication. Also, a degradation in the reception quality of an earlier uplink communication channel can cause a disconnection of an earlier communication through the uplink channel. Alternatively, a degradation in the reception quality of an earlier communication channel can be recovered by the transmission power control in some cases, but an earlier communication through the channel can be disconnected when the reception quality falls short of a signal quality required for communications.

A technology relating to a downlink communication in a radio communications system is described in JP, P2002-325063A, where a cellular system increases a target reception SIR for an uplink data channel by a predetermined offset when a downlink high-rate channel is transmitted. Also, a technology relating to radio communications systems is described in JP, P2003-199173A in which quality information is transmitted, in a mobile communications system, from a mobile station to a base station only when it is required. Further, JP, 8-191418A discloses a call acceptance control method which rejects the acceptance of a new call when it is predicted that there is a mobile station which cannot satisfy a predetermined communication quality at the time the new call is received.

As described above, in a conventional radio communications system in which a plurality of uplink channels can be set, changes in situation or condition a propagation path caused by a communication channel initiated at a later time, such as the uplink high-rate channel, may affect the reception quality of other existing uplink channels which have already been in service. Also, a degraded reception quality of an earlier uplink channel can affect a communication condition, for example, the communication quality on the earlier uplink channel. A degraded reception quality of an earlier uplink channel can cause a disconnection of a communication through the earlier uplink channel.

Also, in an attempt to reduce the influence on an earlier uplink communication channel exerted by changes in condition or situation on a propagation path caused by a communication channel initiated at a later time, such as the uplink high-rate channel, the transmission power can be excessively increased for the earlier uplink channel, or the reception quality can be excessively improved for the earlier uplink channel.

Even in a situation where the outer-loop power control is conducted for an earlier uplink channel, a need exists for reducing the influence on communications on the earlier uplink channel exerted by changes in condition or situation on a propagation path caused by a communication channel initiated at a later time, such as a uplink high-rate channel. Also, in a situation in which the outer-loop power control is conducted for the earlier uplink channel as mentioned above, when an attempt is made to reduce the influence on the earlier uplink channel exerted by changes in condition or situation on the propagation path caused by the communication channel initiated at a later time, such as the uplink high-rate channel, the transmission power can be excessively increased for the earlier uplink channel, or the reception quality can be excessively improved for the earlier uplink channel.

SUMMARY OF THE INVENTION

It is an object of the present invention to provide a radio communications system which solves the problems of the prior art described above and avoids adverse influences on an earlier uplink channel even when an uplink high-rate channel is initiated at a later time.

It is another object of the present invention to provide a radio base station, a radio network controller, and a radio communications device which constitute a radio communications system that avoids adverse influences on an earlier uplink channel even when an uplink high-rate communication channel is initiated at a later time.

It is further object of the present invention to provide a control method in which adverse influences on an earlier uplink communication in a radio communications system is avoided even when an uplink high-rate channel is initiated at a later time.

According to the first aspect of the present invention, a radio base station installed in a radio communications system which includes a radio network controller and a radio communications device comprises transmission/reception means for communicating with the radio network controller, radio transceiver means for communicating with the radio communications device to receive a first communication channel and a second communication channel from the radio communications device, and control means for detecting a reception quality of the first communication channel, conducting an inner-loop power control for controlling transmission power of the first communication channel from the radio communications device based on the reception quality and an inner-loop power control target value, and adding a power control offset to the inner-loop power control target value before the radio transceiver means starts a communication through the second communication channel.

According to the second aspect of the present invention, a radio base station installed in a radio communications system which includes a radio network controller, a first radio communications device, and a second radio communications device comprises transmission/reception means for communicating with the radio network controller, radio transceiver means for communicating with the first and second radio communications devices to receive a first communication channel from the first radio communications device, and receive a second communication channel from the second radio communications device, and control means for detecting a reception quality of the first communication channel, conducting an inner-loop power control for controlling transmission power of the first communication channel from the first radio communications device based on the reception quality and an inner-loop power control target value, and adding a power control offset to the inner-loop power control target value before the radio transceiver means starts a communication through the second communication channel.

According to the third aspect of the present invention, a radio network controller installed in a radio communications system which includes a radio base station, and a radio communications device for making a communication by transmitting a first and a second communication channel to the radio base station comprises transmission/reception means for communicating with the radio base station, and control means for recognizing a request for starting a communication through the second communication channel, and notifying the radio base station of a power control offset through the transmission/reception means, wherein the power control offset is added to a power control target value for an inner-loop power control in regard to the first communication channel between the radio base station and the radio communications device.

According to the fourth aspect of the present invention, a radio network controller installed in a radio communications system which includes a radio base station, and a radio communications device for making a communication by transmitting a first and a second communication channel to the radio base station comprises transmission/reception means for communicating with the radio base station, and control means for conducting an outer-loop power control between the control means and the radio base station through the transmission/reception means for adjusting a power control target value for an inner-loop power control conducted in regard to the first communication channel between the radio communications device and the radio base station, interrupting the outer-loop power control after recognizing a request for starting a communication through the second communication channel, and resuming the outer-loop power control after recognizing the communication through the second communication channel.

According to the fifth aspect of the present invention, a radio communications device for use in a radio communications system which includes a radio network controller and a radio base station comprises radio transceiver means for transmitting a first communication channel and a second communication channel different from the first communication channel to the radio base station, receiving at least one of information for controlling the second communication channel and a notice of permission for the start of a communication through the second communication channel, and starting a communication through the second communication channel based on the control information or the start permission notice, and control means for conducting an inner-loop power control, between the control means and the radio base station through the radio transceiver means, for controlling transmission power of the first communication channel based on a reception quality of the first communication channel at the radio base station, and an inner-loop power control target value, wherein at least one of the control information and the start permission notice is transmitted from the radio base station to the radio communications device after a power control offset is added to the inner-loop power control target value for the inner-loop power control.

According to sixth aspect of the present invention, a radio communications device for use in a radio communications system which includes a radio network controller and a radio base station comprises radio transceiver means for transmitting a first communication channel and a second communication channel to the radio base station, and control means for conducting an inner-loop power control, between the control means and the radio base station through the radio transceiver means, for controlling transmission power of the first communication channel based on a reception quality of the first communication channel at the radio base station, and an inner-loop power control target value, and starting a transmission of the second communication channel through the radio transceiver means after a power control offset is added to the inner-loop power control target value for the inner-loop power control.

According to the present invention, a radio communications device for use in a radio communications system which includes a radio network controller, a radio base station, and a plurality of the radio communications devices comprises radio transceiver means for transmitting a second communication channel to the radio base station, and control means for starting a transmission of the second communication channel through the radio transceiver means after a power control offset is added to a power control target value for the inner-loop power control conducted in regard to a first communication channel between another radio communications device of the plurality of radio communications devices and the radio base station.

According to the present invention, another radio communications system of the present invention comprises a radio network controller, a radio base station, and a radio communications device. In this radio communications system, the radio base station comprises base station transmission/reception means for communicating with the radio network controller, base station radio transceiver means for communicating with the radio communications device to receive a first communication channel and a second communication channel from the radio communications device, and base station control means for detecting a reception quality of the first communication channel, conducting an inner-loop power control for controlling transmission power of the first communication channel from the radio communications device based on the reception quality and an inner-loop power control target value, and adding a power control offset to the inner-loop power control target value before the base station radio transceiver means starts a communication through the second communication channel. The radio network controller comprises controller transmission/reception means for communicating with the radio base station, and controller control means for recognizing a request for starting a communication through the second communication channel, and notifying the radio base station of the power control offset through the controller transmission/reception means. The radio communications device comprises radio communications device transceiver means for transmitting the first communication channel and the second communication channel to the radio base station, and radio communications device control means for conducting the inner-loop power control between the radio communications device and the radio base station through the radio communications device transceiver means, and starting a transmission of the second communication channel through the radio communications device transceiver means after the power control offset is added to the inner-loop power control target value for the inner-loop power control.

According to the present invention, a further radio communications system comprises a radio network controller, a radio base station, and a radio communications device. In this radio communications system, the radio base station comprises base station transmission/reception means for communicating with the radio network controller, base station radio transceiver means for communicating with the radio communications means to receive a first communication channel and a second communication channel from the radio communications device, and base station control means for detecting a reception quality of the first communication channel, conducting an inner-loop power control for controlling transmission power of the first communication channel from the radio communications device based on the reception quality and an inner-loop power control target value, and adding a power control offset to the inner-loop power control target value before the base station radio transceiver means starts a communication through the second communication channel. The network controller comprises controller transmission/reception means for communicating with the radio base station, and controller control means for conducting an outer-loop power control between the network controller and the radio base station through the controller transmission/reception means for adjusting an inner-loop power control target value for an inner-loop power control conducted in regard to the first communication channel between the radio communications device and the radio base station, interrupting the outer-loop power control after recognizing a request for starting a communication through the second communication channel, and resuming the outer-loop power control after recognizing the communication through the second communication channel. The radio communications device comprises radio communications device transceiver means for transmitting the first communication channel and the second communication channel to the radio base station, and radio communications device control means for conducting the inner-loop power control between the radio communications means and the radio base station through the radio communications device transceiver means, and starting a transmission of the second communication channel through the radio communications device transceiver means after the power control offset is added to the inner-loop power control target value for the inner-loop power control.

According to the present invention, a still further radio communications system comprises a radio network controller, a radio base station, and a first and a second radio communications device. In this radio communications system, the radio base station comprises base station transmission/reception means for communicating with the radio network controller, base station radio transceiver means for receiving a first communication channel from the first radio communications device, and receiving a second communication channel from the second radio communications device, and base station control means for detecting a reception quality of the first communication channel, conducting an inner-loop power control for controlling transmission power of the first communication channel from the first radio communications device based on the reception quality and an inner-loop power control target value, and adding a power control offset to the inner-loop power control target value before the base station radio transceiver means starts a communication through the second communication channel. The radio network controller comprises controller transmission/reception means for communicating with the radio base station. The first radio communications device comprises first radio communications device transceiver means for transmitting the first communication channel to the radio base station, and first radio communications device control means for conducting the inner-loop power control between the first radio communications device and the radio base station through the first radio communications device transceiver means. The second radio communications device comprises second radio communications device transceiver means for transmitting the second communication channel to the radio base station, and second radio communications device control means for starting a transmission of the second communication channel through the radio transceiver means after the power control offset is added to the inner-loop power control target value for the inner-loop power control.

According to the present invention, a method of controlling a radio communications system which includes a radio network controller, a radio communications device, and a radio base station comprises the steps of: receiving a first communication channel from the radio communications device at the base station, detecting a reception quality of the first communication channel at the base station, conducting an inner-loop power control for controlling transmission power of the first communication channel from the radio communications device based on the reception quality and an inner-loop power control target value, and adding a power control offset to the inner-loop power control target value before starting a communication through a second communication channel.

According to the present invention, a method of controlling a radio communications system which includes a radio base station, a radio communications device for making a communication by transmitting a first and a second communication channel to the radio base station, and a radio network controller comprises the steps of: recognizing a request for starting a communication through the second communication channel to generate a power control offset in the radio network controller, notifying the radio base station of the power control offset, and adding the power control offset to a power control target value for an inner-loop power control in regard to the first communication channel between the radio base station and the radio communications device.

According to the present invention, another method of controlling a radio communications system which includes a radio base station, a radio communications device for making a communication by transmitting a first and a second communication channel to the radio base station, and a radio network controller comprises the steps of: conducting an outer-loop power control between the radio network controller and the radio base station for adjusting a power control target value for an inner-loop power control conducted in regard to the first communication channel between the radio communications device and the radio base station, interrupting the outer-loop power control after recognizing a request for starting a communication through the second communication channel in the radio network controller, and resuming the outer-loop power control after recognizing the start of a communication through the second communication channel in the radio network controller.

According to the present invention, another method of controlling a radio communication system which includes a radio network controller, a radio base station, and a radio communications device comprises the steps of: the radio communications device transmitting a first communication channel and a second communication channel to the radio base station, conducting an inner-loop power control between the radio communications device and the radio base station for controlling transmission power of the first communication channel based on a reception quality of the first communication channel at the radio base station and an inner-loop power control target value, and the radio communications device starting a transmission of the second communication channel to the radio base station after a power control offset is added to the inner-loop power control target value for the inner-loop power control.

According to the present invention, a method of controlling a radio communications system which includes a radio network controller, a radio base station, and a first and a second radio communications device comprises the steps of: transmitting a first communication channel from the first radio communications device to the radio base station, transmitting a second communication channel from the second radio communications device to the radio base station, and starting a transmission of the second communication channel after a power control offset is added to a power control target value for an inner-loop power control conducted in regard to the first communication channel between the first radio communications device and the radio base station.

According to the present invention, a further method of controlling a radio communications system which comprises a radio network controller, a radio base station, and a radio communications device comprises the steps of: transmitting a first communication channel from the radio communications device to the radio base station, detecting a reception quality of the first communication channel at the base station, conducting an inner-loop power control between the radio communications device and the radio base station for controlling transmission power of the first communication channel from the radio communications device based on the reception quality and an inner-loop power control target value, recognizing a request for starting a communication through a second communication channel in the radio base station, and adding a power control offset to the inner-loop power control target value, and the radio communications device starting a transmission of the second communication channel after the power control offset is added to the inner-loop power control target value for the inner-loop power control.

According to the present invention, a still further method of controlling a radio communications system which comprises a radio network controller, a radio base station, and a radio communications device comprises the steps of: transmitting a first communication channel from the radio communications device to the radio base station, detecting a reception quality of the first communication channel at the radio base station, conducting an inner-loop power control between the radio communications device and the radio base station for controlling transmission power of the first communication channel from the radio communications device based on the reception quality and an inner-loop power control target value, conducting an outer-loop power control between the radio network controller and the radio base station for adjusting the inner-loop power control target value, interrupting the outer-loop power control after recognizing a request for starting a communication through the second communication channel in the radio base station, adding a power control offset to the inner-loop power control target value, resuming the outer-loop power control after recognizing the start of a communication through the second communication channel in the radio base station, and starting a transmission of the second communication channel in the radio communications device after the power control offset is added to the inner-loop power control target value.

According to the present invention, another method of controlling a radio communications system which includes a radio network controller, a radio base station, and a first and a second radio communications device comprises the steps of: transmitting a first communication channel from the first communications device to the radio base station, transmitting a second communication channel from the second radio communications device to the radio base station, detecting a reception quality of the first communication channel at the radio base station, conducting an inner-loop power control for controlling transmission power of the first communication channel from the first radio communications device based on the reception quality and an inner-loop power control target value, adding a power control offset to the inner-loop power control target value after recognizing a request for staring a communication through the second communication channel, and starting a transmission of the second communication channel after the power control offset is added to the inner-loop power control target value.

According to the present invention, it is possible to reduce the influence exerted on a communication through an earlier communication channel by a degradation in the reception quality of the earlier communication channel caused by a communication through a later communication channel, and to prevent an excessive increase in transmission power of the earlier communication channel and an excessive improvement in the reception quality of the earlier communication channel.

According to the present invention, even in a condition or situation in which the outer-loop power control is being conducted in regard to an earlier communication channel, it is possible to reduce the influence exerted on a communication through an earlier communication channel by a degradation in the reception quality of the earlier communication channel caused by a communication through a later communication channel, and to prevent an excessive increase in transmission power of the earlier communication channel and an excessive improvement in the reception quality of the earlier communication channel.

The above and other objects, features, and advantages of the present invention will become apparent from the following description with reference to the accompanying drawings which illustrate an example of the present invention.

DETAILED DESCRIPTION OF THE PREFERRED EMBODIMENTS

Figure 1:
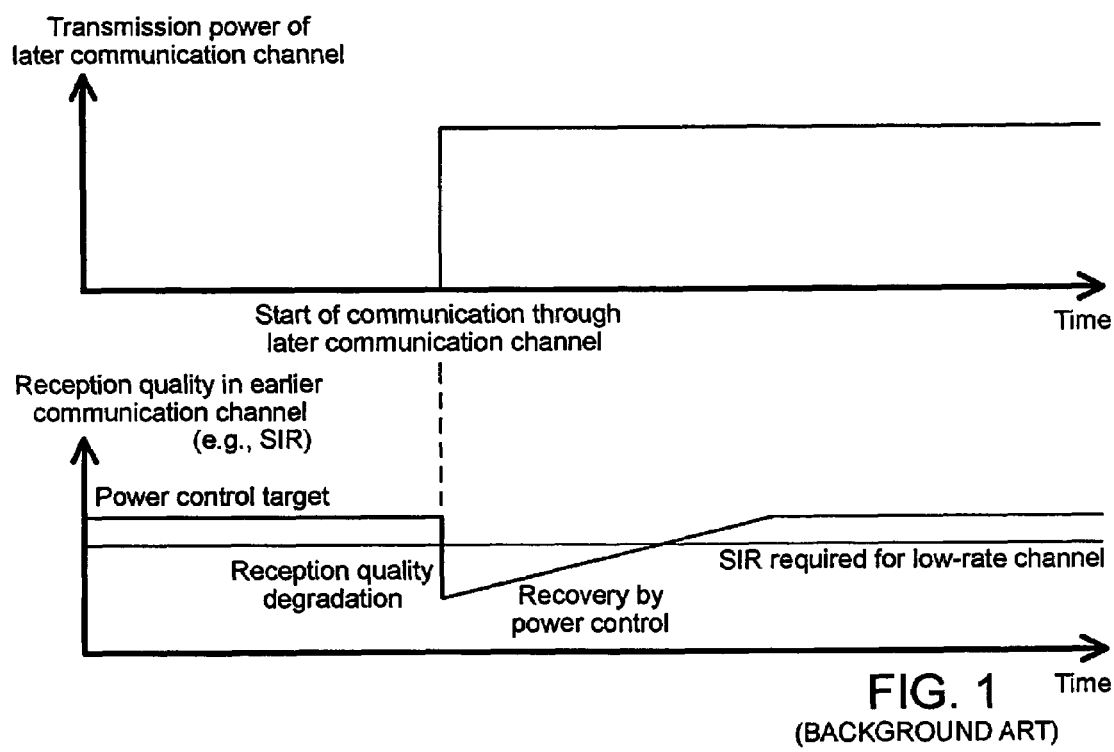
FIG. 1 is a graph showing changes in respective parameters in a conventional radio communications system.
Figure 2:
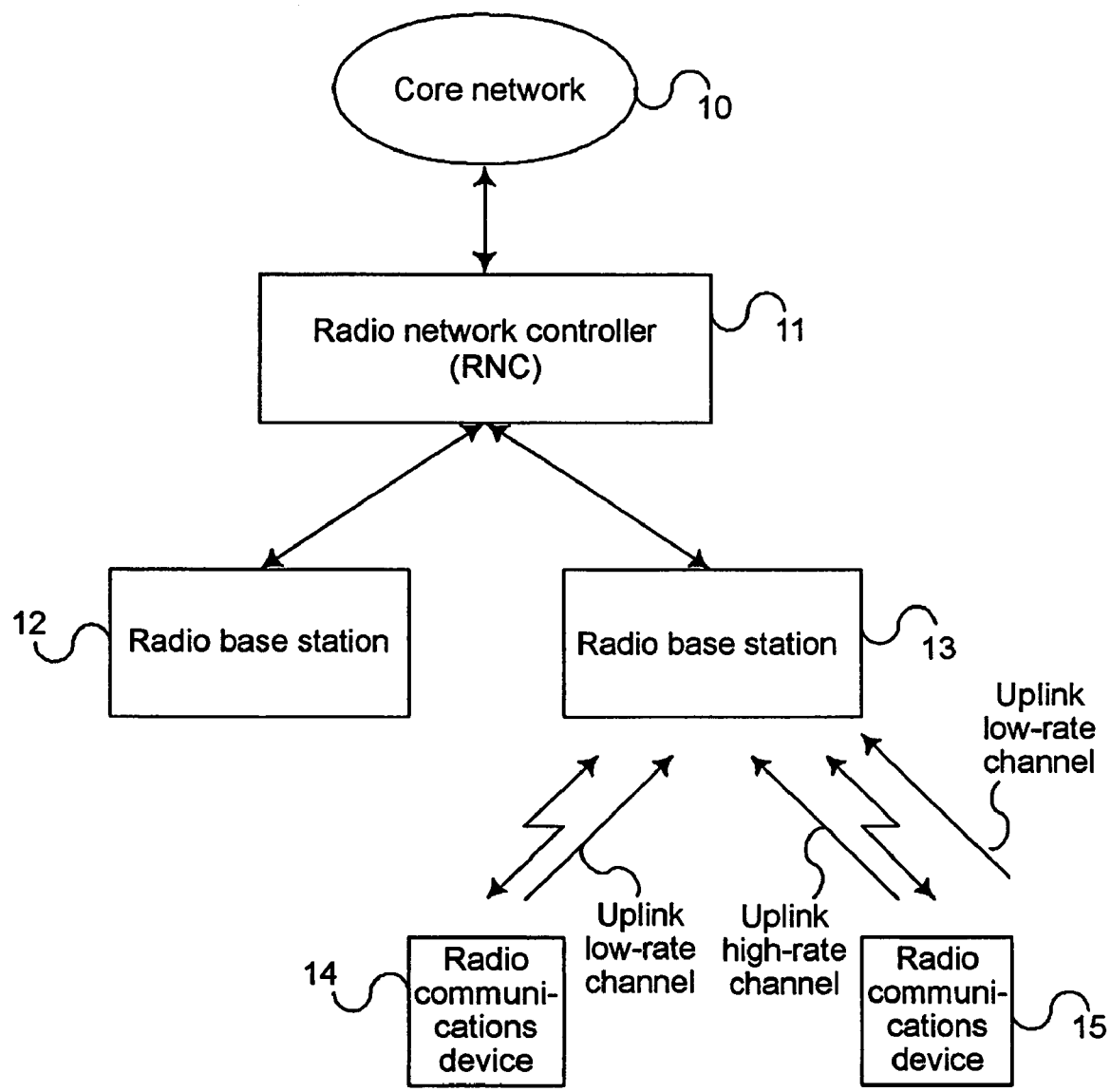
FIG. 2 is a block diagram illustrating the configuration of a radio communications system according to a first embodiment of the present invention.

FIG. 2 is illustrates the configuration of a radio communications system according to a first embodiment of the present invention. Note that FIG. 2 illustrates only those components which are required for describing the present invention.

The radio communications system illustrated in FIG. 2 comprises core network 10; radio network controller (RNC) 11 connected to core network 10; radio base stations (BS) 12, 13 connected to radio network controller 11; and radio communications devices 14, 15 connected to radio base stations 12, 13 through a radio channel.

Figure 3:
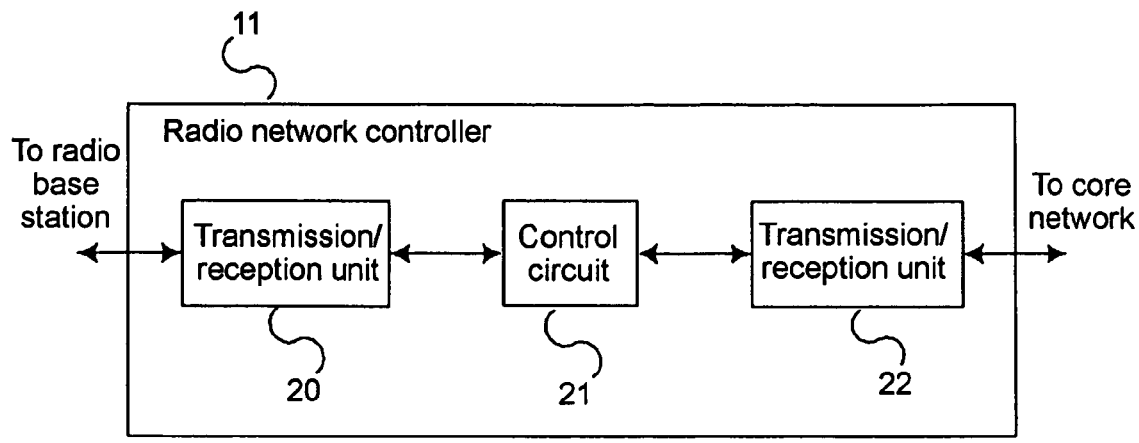
FIG. 3 is a block diagram illustrating the configuration of a radio network controller.

As illustrated in FIG. 3, radio network controller 11 comprises transmission/reception (Tx/Rx) unit 20 for connection with a base station; control circuit 21 for controlling the operation of radio network controller 11; and transmission/reception unit 22 for connection with core network 10.

In radio network controller 11, transmission/reception unit 20 transmits a signal and/or information received from control circuit 21 to at least one of radio base stations 12, 13. Transmission/reception unit 20 also transmits a signal and/or information received from at least one of radio base stations 12, 13 to control circuit 21.

Control circuit 21 receives a signal and/or information from at least one of radio base stations 12, 13 through transmission/reception unit 20, and transmits part or all of the received signal and/or information to core network 10 through transmission/reception unit 22. Control circuit 21 also receives a signal and/or information from core network 10 through transmission/reception unit 22, and transmits part or all of the received signal and/or information to at least one of radio base stations 12, 13 through transmission/reception unit 20. Further, control circuit 21 transmits a signal and/or information required for communications between radio base station 12 or 13 and radio communications device 14 or 15 to at least one of radio base stations 12, 13.

Transmission/reception unit 22 transmits a signal and/or information received from control circuit 21 to core network 10, and transmits a signal and/or information received from core network 10 to control circuit 21.

Figure 4:
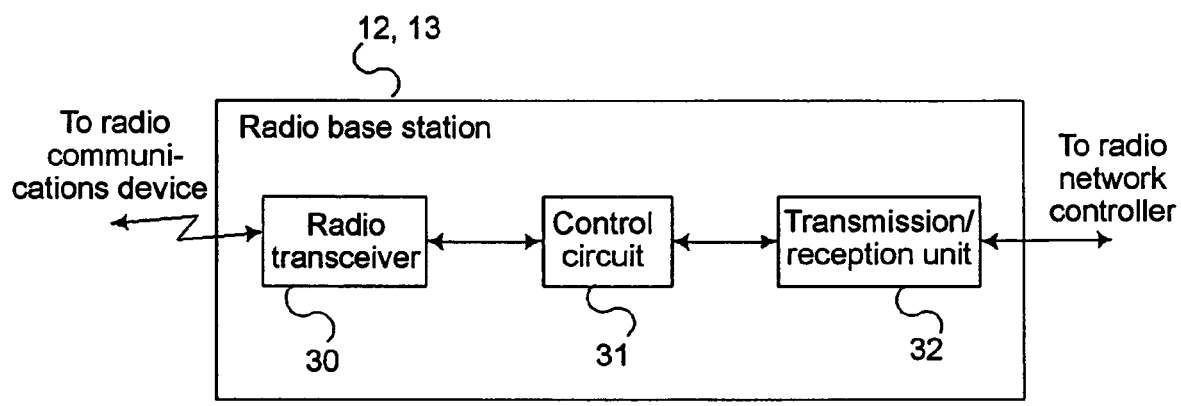
FIG. 4 is a block diagram illustrating the configuration of a radio base station.

FIG. 4 illustrates the configuration of radio base stations 12, 13. Since radio base stations 12, 13 employs the same configuration, the configuration of radio base station 13 alone will be described here. Radio base station 13 comprises radio transceiver 30 for communicating with a radio communications device through a radio channel; control circuit 31 for controlling the operation of radio base station 13; and transmission/reception unit 32 for connecting to radio network controller 11.

Transmission/reception unit 32 receives a signal and/or information from radio network controller 11 and sends the received signal and/or information to control circuit 31, and transmits a signal and/or information received from control circuit 31 to radio network controller 11.

Control circuit 31 receives a signal and/or information from radio network controller 11 through transmission/reception unit 32, and transmits part or all of the received signal and/or information to at least one of radio communications devices 14, 15 through radio transceiver 30. Control circuit 31 further receives a signal and/or information from at least one of radio communications devices 14, 15 through radio transceiver 30, and transmits the received signal and/or information to radio network controller 11 through transmission/reception unit 32.

Here, the signal and/or information received by control circuit 31 from radio communications devices 14, 15 includes at least one of an earlier communication channel, and a later communication channel on which a transmission/reception is started later than the earlier communication channel. In the following description, the earlier communication channel is exemplified by an uplink low-rate communication channel, and the later communication channel is exemplified by an uplink high-rate communication channel. However, the present invention is not limited by a data rate, a modulation method, a spread code, a type and the like of the earlier communication channel and later communication channel.

In addition, the signal and/or information received by control circuit 31 from radio communications device 14, 15 includes information for controlling at least one of the uplink low-rate channel and uplink high-rate channel. The signal and/or information transmitted by control circuit 31 to radio communications devices 14, 15, in turn, includes information for controlling at least one of the uplink low-rate channel and uplink high-rate channel. Control circuit 31 detects the reception quality of the uplink low-rate channel, and conducts an inner-loop power control in regard to the uplink low-rate channel between control circuit 31 and at least one of radio communications devices 14, 15 through radio transceiver 30. This inner-loop power control controls the transmission power for the uplink low-rate channel of at least one of radio communications devices 14, 15. Control circuit 31 further controls communications through the uplink high-rate channel between radio base station 13 and at least one of radio communications devices 14, 15.

Preferably, the inner-loop power control can be a control as described below. Radio base station 13 detects the reception quality of the uplink low-rate channel received from radio communications device 15 at predetermined time intervals, and compares the detected reception quality with an inner-loop power control target value. Radio base station 13 generates an inner-loop power control signal which instructs an increase in transmission power when the reception quality is below the control target value, and generates an inner-loop power control signal which instructs a decrease in transmission power when the reception quality is above the control target value. Radio base station 13 transmits the generated inner-loop power control signal to radio communications device 15 at predetermined time intervals. Radio communications device 15 receives the inner-loop power control signal from radio base station 13. Radio communications device 15 increases the transmission power for the uplink low-rate channel by a predetermined value when the received inner-loop power control signal instructs an increase in the transmission power, and reduces the transmission power for the uplink low-rate channel by a predetermined value when the received inner-loop power control signal instructs a decrease in the transmission power. By repeating the foregoing control, the transmission power is adjusted such that the reception quality of the uplink low-rate channel transmitted by radio communications device 15, as detected at radio base station 13, approaches a value near the inner-loop power control target value. Likewise, between radio base station 13 and radio communications device 14, the control can be conducted in a similar manner to the control between radio base station 13 and radio communications device 15.

Preferably, the reception quality of the uplink low-rate channel, and the inner-loop power control target value can be represented by a signal-to-interference ratio (SIR), signal-to-interference (Eb/No) per bit, or the like.

Figure 5:
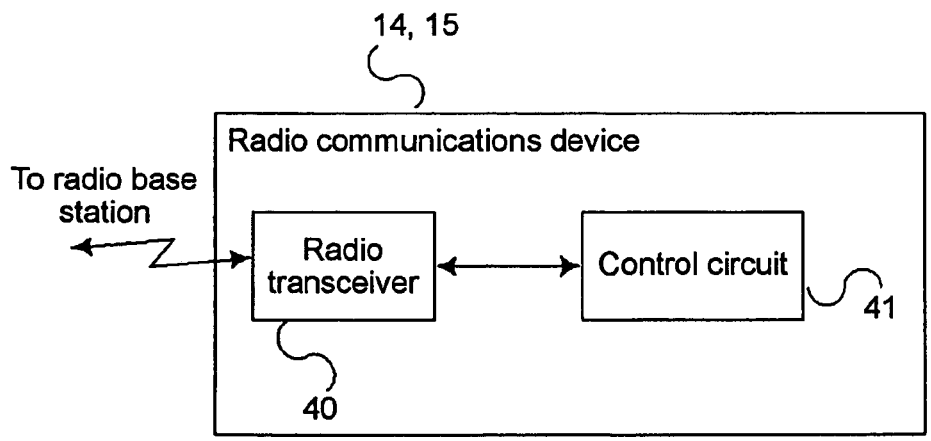
FIG. 5 is a block diagram illustrating the configuration of a radio communications device.

FIG. 5 illustrates the configuration of radio communications devices 14, 15. Since radio communications devices 14, 15 employ the same configuration, the configuration of radio communications device 15 alone will be described here. Radio communication device 15 comprises radio transceiver 40 for communicating with a radio base station through a radio channel; and a control circuit 41 for controlling the operation of radio communications device 15. In this embodiment, radio communications device 15 may be, for example, a mobile terminal or a mobile station which moves within a service area of a radio communications network.

Radio transceiver 40 receives a signal and/or information from radio base station 13, and sends the received signal and/or information to control circuit 41. The radio transceiver 40 also receives a signal and/or information from control circuit 41, and transmits the received signal to radio base station 13.

Control circuit 41 receives a signal and/or information from radio base station 13 through radio transceiver 40, and transmits a signal and/or information to radio base station 13 through radio transceiver 40. Here, the signal and/or information transmitted by control circuit 41 to radio base station 13 includes at least one of the uplink low-rate channel and uplink high-rate channel. Further, the signal and/or information transmitted by control circuit 41 to radio base station 13 includes information for controlling at least one of the uplink low-rate channel and uplink high-rate channel. The signal and/or information received by control circuit 41 from radio base station 13 includes information for controlling at least one of the uplink low-rate channel and uplink high-rate channel.

In this embodiment, control circuit 41 of radio communications device 15 conducts the inner-loop power control in regard to the uplink low-rate channel between control circuit 31 and radio base station 13 through radio transceiver 40. Control circuit 41 also controls communications through the uplink high-rate channel between radio base station 13 and radio communications device 15.

Figure 6:
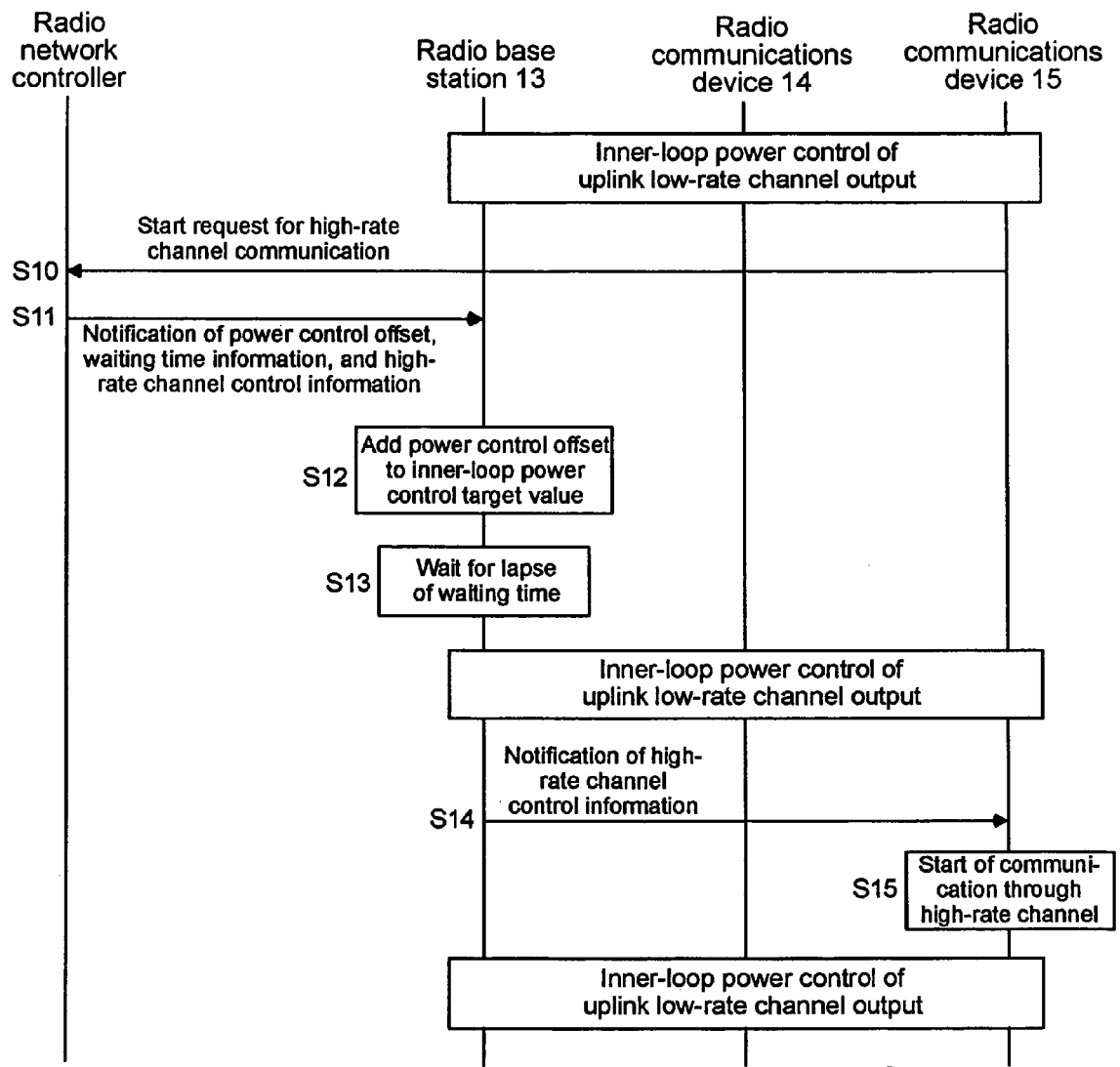
FIG. 6 is a sequence diagram illustrating an exemplary operation of the radio communications system in the first embodiment.

FIG. 6 illustrates the operation of the radio communication network illustrated in FIGS. 2 to 4.

From an initial state, irrespective of other operations, the inner-loop power control in regard to the uplink low-rate channel is continuously conducted between radio base station 13 and radio communications devices 14, 15. In this situation, radio communications device 15 notifies radio base station 13 of a request for starting a communication through the uplink high-rate channel as information for controlling a communication through the uplink high-rate channel. Specifically, control circuit 41 of radio communications device 15 transmits a start request to radio base station 13 through radio transceiver 40 at step S10. The start request directly reaches radio network controller 11 through radio base station 13, and control circuit 21 of radio network controller 11 receives this start request through transmission/reception unit 20. At step S10, radio communication device 15 can also transmit a request for starting a communication through the uplink high-rate channel to radio base station 13. In this event, radio base station 13 receives the start request, and transmits this start request to radio network controller 11. Specifically, control circuit 31 of radio base station 13 receives a start notice through radio transmitter 30, and transmits the start notice to radio network controller 11 through transmission/reception unit 32. Control circuit 21 of radio network controller 11 receives the start request through transmission/reception unit 20.

The foregoing description has been given of radio network controller 11 which is configured to receive the start request from radio base station 13 or radio communication device 15 at step S10. Preferably, however, the aforementioned step S10 may be omitted. In this event, radio network controller 11 can be configured to recognize a request for starting a communication through the uplink high-rate channel by acquiring information on the start request acquired from core network 10, or requesting the start of a communication through the uplink high-rate channel by itself.

After step S10, radio network controller 11 generates a power control offset and waiting time information, as information for controlling the communication through the uplink low-rate channel, and notifies radio base station 13 of them at step S11. Also, radio network controller 11 generates uplink high-rate channel control information, as information for controlling the communication through the uplink high-rate channel, and notifies radio base station 13 of this information at step S11. Specifically, control circuit 21 of radio network controller 11 generates the power control offset, waiting time information, and uplink high-rate channel control information, all of which are transmitted to radio base station 13 through transmission/reception unit 20. Control circuit 31 of radio base station 13 receives the power control offset, waiting time information, and uplink high-rate channel information through transmission/reception unit 32.

Subsequently, control circuit 31 of radio base station 13 adds the notified power control offset to the power control target value for the inner-loop power control in regard to the uplink low-rate channel at step S12. Here, control circuit 31 can add the same power control offset value to the power control target values associated with radio communications devices 14, 15, respectively, or add different power control offset values to the respective power control target values.

In the inner-loop power control at step S12 onward, the transmission power of the uplink low-rate channel is controlled based on the inner-loop power control target value to which the power control offset was added. After step S12, control circuit 31 of radio base station 13 waits for a waiting time at step S13. However, even during the waiting time, the inner-loop power control is continuously conducted between radio base station 13 and radio communications devices 14, 15. After the lapse of the waiting time, radio base station 13 starts a communication with radio communications device 15 through the uplink high-rate channel. Specifically, after the lapse of the waiting time, control circuit 31 of radio base station 13 transmits uplink high-rate channel control information to radio communications device 15 through radio transceiver 30 as information for a communication through the uplink high-rate channel at step S14. Control circuit 41 of radio communications device 15 receives the uplink high-rate channel control information through radio transceiver 40. Upon receipt of the uplink high-rate channel control information, control circuit 41 of radio communications device 15 starts the transmission of the uplink high-rate channel to radio base station 13 through radio transceiver 40 at step S15.

The waiting time at step S13 can be preferably a time interval which is required to sufficiently improve the reception quality of the uplink low-rate communication channel by the inner-loop power control after the power control offset was added to the inner-loop power control target value. Such a waiting time is required because the inner-loop power control increases or decreases the transmission power by a predetermined value per control session, and the reception quality cannot be varied by a changing amount of the inner-loop power control target value simultaneously with the change in the inner-loop power control target value.

In FIG. 6 a description has been given that radio network controller 11 transmits the power control offset, waiting time information, and uplink high-rate channel control information to radio base station 13. Alternatively, at least one of the power control offset, waiting time information, and uplink high-rate communication channel control information may be generated by or may be previously held in radio base station 13.

Figure 7:
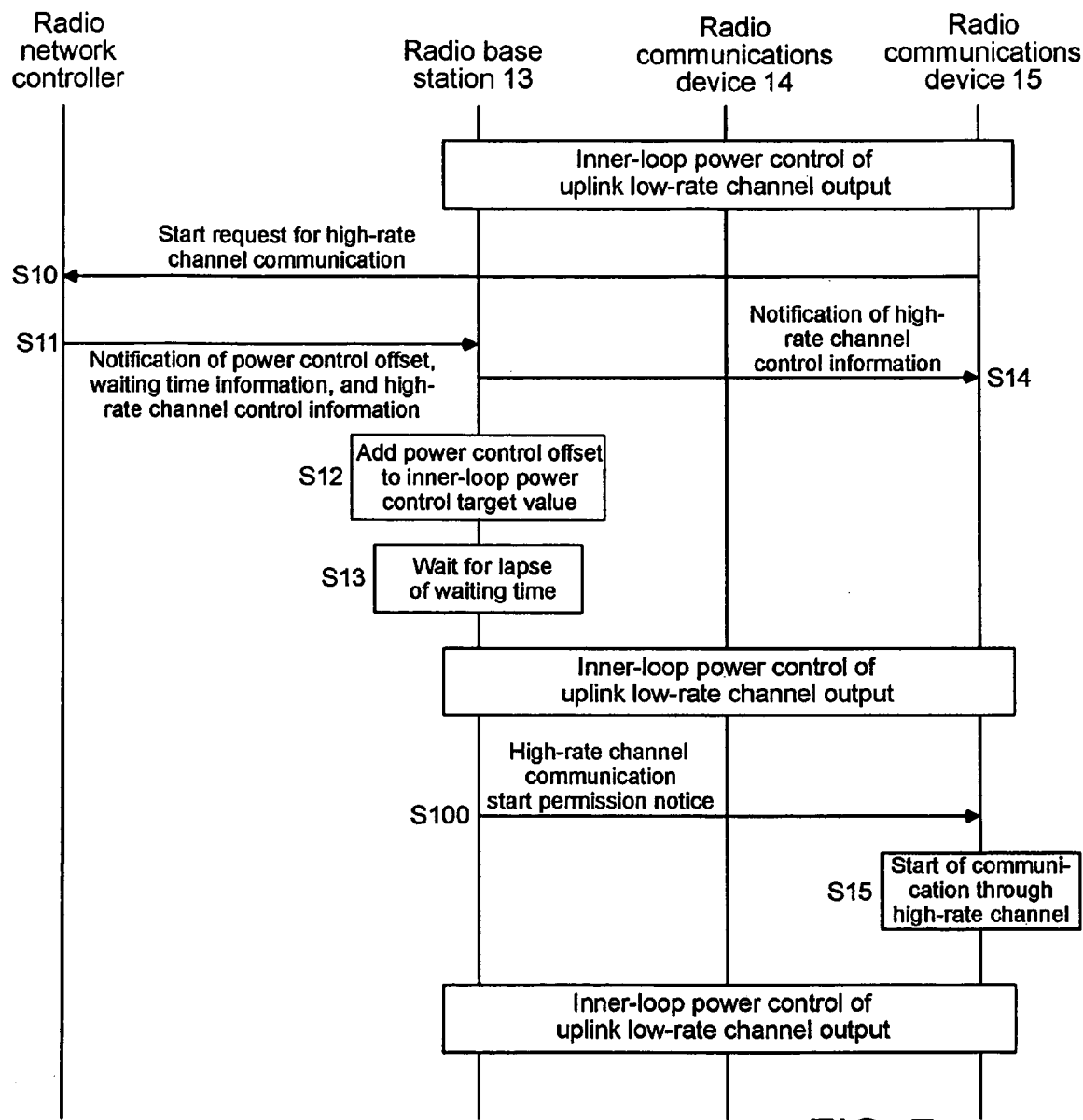
FIG. 7 is a sequence diagram illustrating another exemplary operation in the first embodiment.

In FIG. 6, a description has been given that radio base station 13 transmits the uplink high-rate channel control information to radio communications device 15, thereby starting a communication through the uplink high-rate channel. Alternatively, as illustrated in FIG. 7, radio base station 13 may transmit an uplink high-rate channel communication start permission notice different from the uplink high-rate channel control information to radio communications device 15, thereby starting a communication through the uplink high-rate channel. In this alternative configuration, radio base station 13 transmits the uplink high-rate channel control information to radio base station 15 at step S14 prior to the transmission of the uplink high-rate channel communication start permission notice. After the lapse of the waiting time, radio base station 13 notifies radio communications device 15 of the uplink high-rate communication channel communication start permission notice. Specifically, after the lapse of the waiting time, control circuit 31 of radio base station 13 transmits the uplink high-rate channel communication start permission notice to radio communications device 15 through radio transceiver 32. Control circuit 41 of radio communications device 15 receives the uplink high-rate channel communication start permission notice through radio transceiver 40 at step S100. Upon receipt of the uplink high-rate channel communication start permission notice, radio communications device 15 starts a communication through the uplink high-rate channel. Specifically, control circuit 41 of radio communications device 15 which has received the uplink high-rate channel starts a transmission of the uplink high-rate channel to radio base station 13 through radio transceiver 40 at step S15.

Figure 8:
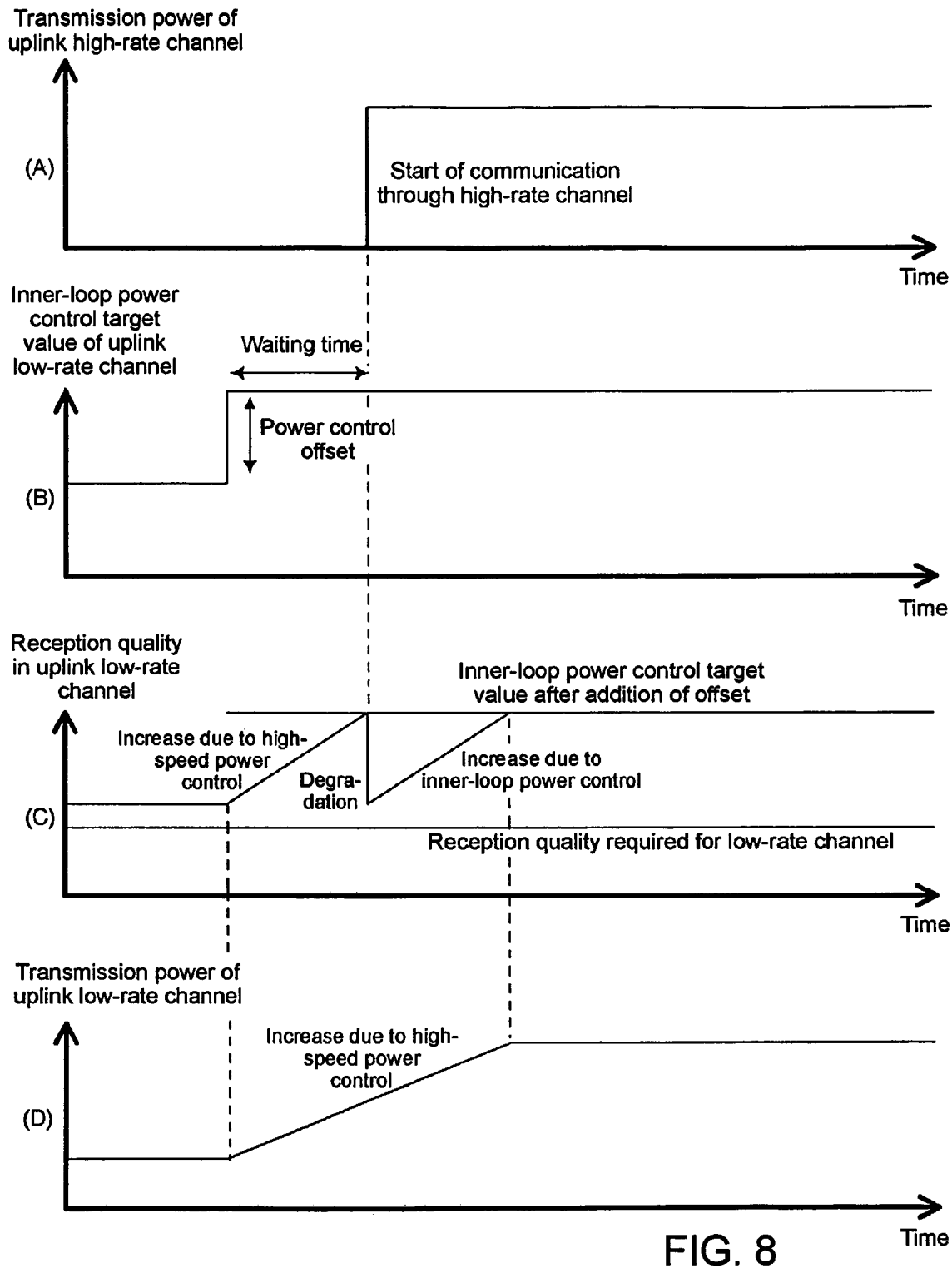
FIG. 8 is a graph showing changes in respective parameters in the radio communications system of the first embodiment.

FIG. 8 shows changes in respective parameters when the radio communications system is operating in accordance with the respective sequence diagrams of FIGS. 6 and 7.

A change in the transmission power of the uplink high-rate channel is illustrated in (A) of FIG. 8. The transmission power, which is initially zero, rises with the start of a communication through the high-rate communication channel at step S15 in FIG. 6 or FIG. 7, and subsequently levels off at a fixed value.

A change in the power control target value for the inner-loop power control in regard to the uplink low-rate channel transmitted by the radio communications device is illustrated in (B) of FIG. 8. The control target value is increased by the power control offset before a period corresponding to step S12 in FIG. 6 or FIG. 7, i.e., the waiting time prior to the time at which a communication through the uplink high-rate channel is started.

A change in the reception quality, detected at the radio base station, of the uplink low-rate channel transmitted by the radio communications device is illustrated in (C) of FIG. 8. From a time the waiting time prior to the time at which a communication is started through the uplink high-rate channel to the time at which the uplink high-rate channel is started, the reception quality is improved on the low-rate communication channel. This is attributable to the addition of the power control offset to the power control target value for the uplink inner-loop power control at step S12 in FIG. 6 or FIG. 7. The reception quality of the uplink low-rate channel is degraded with the start of a communication through the uplink high-rate channel. This degradation in the reception quality is attributable to an increase in interfering power caused by the uplink high-rate channel, and the like. However, since the reception quality of the uplink low-rate channel has been improved before the start of the communication through the uplink high-rate channel, the reception quality of the uplink low-rate channel will not fall short of a required reception quality even if it is degraded with the start of the communication through the uplink high-rate channel. After starting the communication through the uplink high-rate channel, the reception quality of the uplink low-rate channel is again improved by the inner-loop power control.

A change in the transmission power of the uplink low-rate channel transmitted by the radio communications device is illustrated in (D) of FIG. 8. The transmission power of the uplink low-rate channel begins ramping up the waiting time prior to the start of a communication through the uplink high-rate channel, and subsequently levels off at a fixed value. This is attributable to the addition of the power control offset to the power control target value for the inner-loop power control at step S12 in FIG. 6 or FIG. 7.

As shown in FIG. 8, in the first embodiment, the reception quality of the uplink low-rate channel will not fall short of a required reception quality with the start of a communication through the uplink high-rate channel.

In the first embodiment, the uplink high-rate channel control information may include information on a start timing of a communication through the uplink high-rate channel. In this alternative configuration, radio communications device 15 starts a communication through the uplink high-rate channel based on the information on the start timing which has been received as the uplink high-rate channel control information.

Specifically, upon receipt of the information on the timing of starting a communication through the uplink high-rate channel through radio transceiver 40, control circuit 41 of radio communications device 15 starts a transmission of the uplink high-rate channel to radio base station 13 through radio transceiver 40 based on the received information on the start timing.

Further alternatively, the first embodiment may employ radio network controller 11 which is configured to notify radio base station 12 of information on the start of a communication through the uplink high-rate channel. In this alternative configuration, radio base station 12 adds the power control offset to the power control target value for the inner-loop power control. By employing such a configuration, a communication through the uplink high-rate channel can less affect a communication through a communication channel of an adjacent radio base station.

The information on the start of a communication through the uplink high-rate channel may include at least one of a request for starting a communication through the uplink high-rate channel or a notice of the request for the start, and the power control offset.

The power control offset added to the inner-loop power control target value may be generated by radio base station 12, or may be previously held in radio base station 12.

Next, a description will be given of a second embodiment of the present invention. The hardware configuration of the radio communication system used herein is the same as the first embodiment described in connection with FIGS. 2 to 5. The second embodiment differs from the first embodiment in that radio base station 13 subtracts the power control offset from the inner-loop power control target value to which the power control offset has been added, after starting a communication through the uplink high-rate communication channel.

Figure 9:
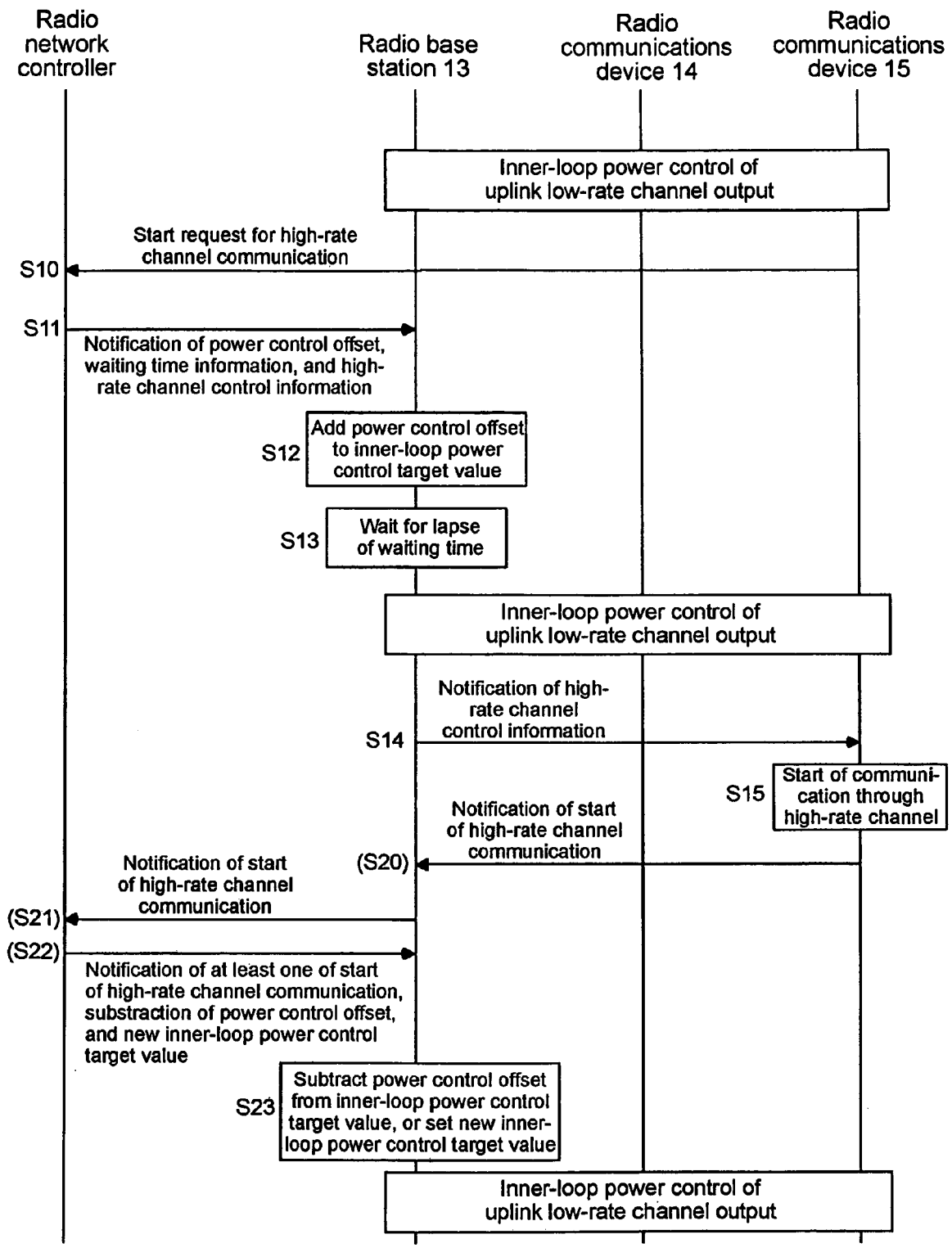
FIG. 9 is a sequence diagram illustrating an exemplary operation of the radio communications system in a second embodiment of the present invention.

FIG. 9 illustrates the operation of the radio communication system in the second embodiment. Here, steps S10 through S15 are similar to those in the first embodiment shown in FIG. 6.

Radio communications device 15 starts a communication through the uplink high-rate channel at step 15, and notifies radio base station 13 at step S20 that the communication through the uplink high-rate channel has been started. Upon receipt of the notice that the communication has been started through the uplink high-rate channel, radio base station 13 subtracts the power control offset from the inner-loop power control target value to which the power control offset has been added, or sets a new inner-loop power control target value at step S23. Specifically, control circuit 41 of radio communications device 15 transmits to radio base station 13 through radio transceiver 40 a notice that radio communications device 15 has started a communication through the uplink high-rate channel. Control circuit 31 of radio base station 13 receives through radio transceiver 30 the notice that radio communications device 15 has started a communication through the uplink high-rate channel. Control circuit 31 of radio base station 13, which has received the notice that radio communications device 15 has started a communication through the uplink high-rate channel, subtracts the power control offset from the inner-loop power control target value to which the power control offset has been added, or sets a new inner-loop power control target value. In this event, the inner-loop power control target value can be previously held in radio base station 13.

In the configuration described above, radio communications device 15 notifies radio base station 13 that radio communications device 15 has started a communication through the uplink high-rate channel. In addition, the notice from radio communications device 15 that it has been started a communication through the uplink high-rate channel may also be transmitted from radio base station 13 to radio network controller 11, as shown at step S21. In this event, upon receipt of the notice of the start of a communication through the uplink high-rate channel, radio network controller 11 transmits to radio base station 13 at step S22 at least one of a notice that the communication through the uplink high-rate channel has been started, a notice that the power control offset should be subtracted from the inner-loop power control target value, and a new inner-loop power control target value. Radio base station 13, which has received the notice at step S22, subtracts the power control offset from the inner-loop power control target value to which the power control offset has been added, or sets a new power control target value at the aforementioned step S23.

In a series of processing illustrated in FIG. 9, steps S20 through S22 may be omitted. In this event, upon recognition of the start of a communication through the uplink high-rate channel, radio base station 13 subtracts the power control offset from the inner-loop power control target value to which the power control offset has been added, or sets a new inner-loop power control target value at step S23. Preferably, radio base station 13 can recognize the start of a communication through the uplink high-rate channel based on the waiting time information. In this event, the internal inner-loop power control target value can be previously held in radio base station 13.

Here, the new inner-loop power control target value can be the same value for both radio communications devices 14, 15 or a different value for each of radio communications devices 14, 15.

Figure 10:
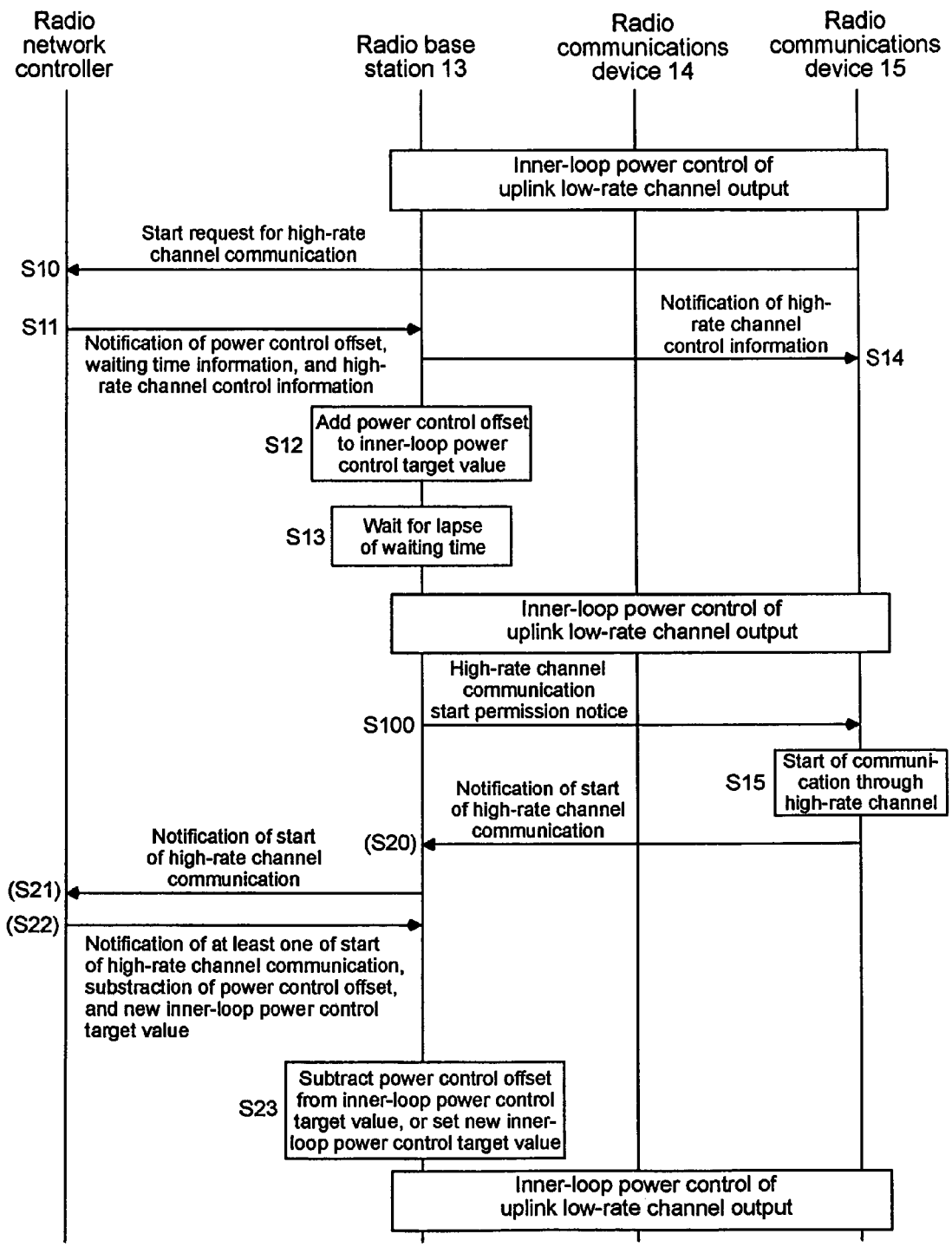
FIG. 10 is a sequence diagram illustrating another exemplary operation in the second embodiment.

In FIG. 9, a description has been given that radio base station 13 transmits the uplink high-rate channel control information to radio communications device 15, thereby starting a communication through the uplink high-rate channel. Alternatively, as illustrated in FIG. 10, radio base station 13 may transmit to radio communications device 15 an uplink high-rate channel communication start permission notice different from the uplink high-rate channel control information, thereby starting a communication through the uplink high-rate channel. In this alternative configuration, radio base station 13 transmits the uplink high-rate channel control information to radio base station 15 at step S14 prior to the transmission of the uplink high-rate channel communication start permission notice. After the lapse of the waiting time, radio base station 13 notifies radio communications device 15 of the uplink high-rate channel communication start permission notice. Specifically, after the lapse of the waiting time, control circuit 31 of radio base station 13 transmits the uplink high-rate channel communication start permission notice to radio communications device 15 through radio transceiver 32 at step S200. Control circuit 41 of radio communications device 15 receives the uplink high-rate channel communication start permission notice through radio transceiver 40. Upon receipt of the uplink high-rate channel communication start permission notice, radio communications device 15 starts a communication through the uplink high-rate channel. Specifically, control circuit 41 of radio communications device 15, which has received the uplink high-rate channel communication start permission notice, starts a transmission of the uplink high-rate channel to radio base station 13 through radio transceiver 40 at step S15.

Figure 11:
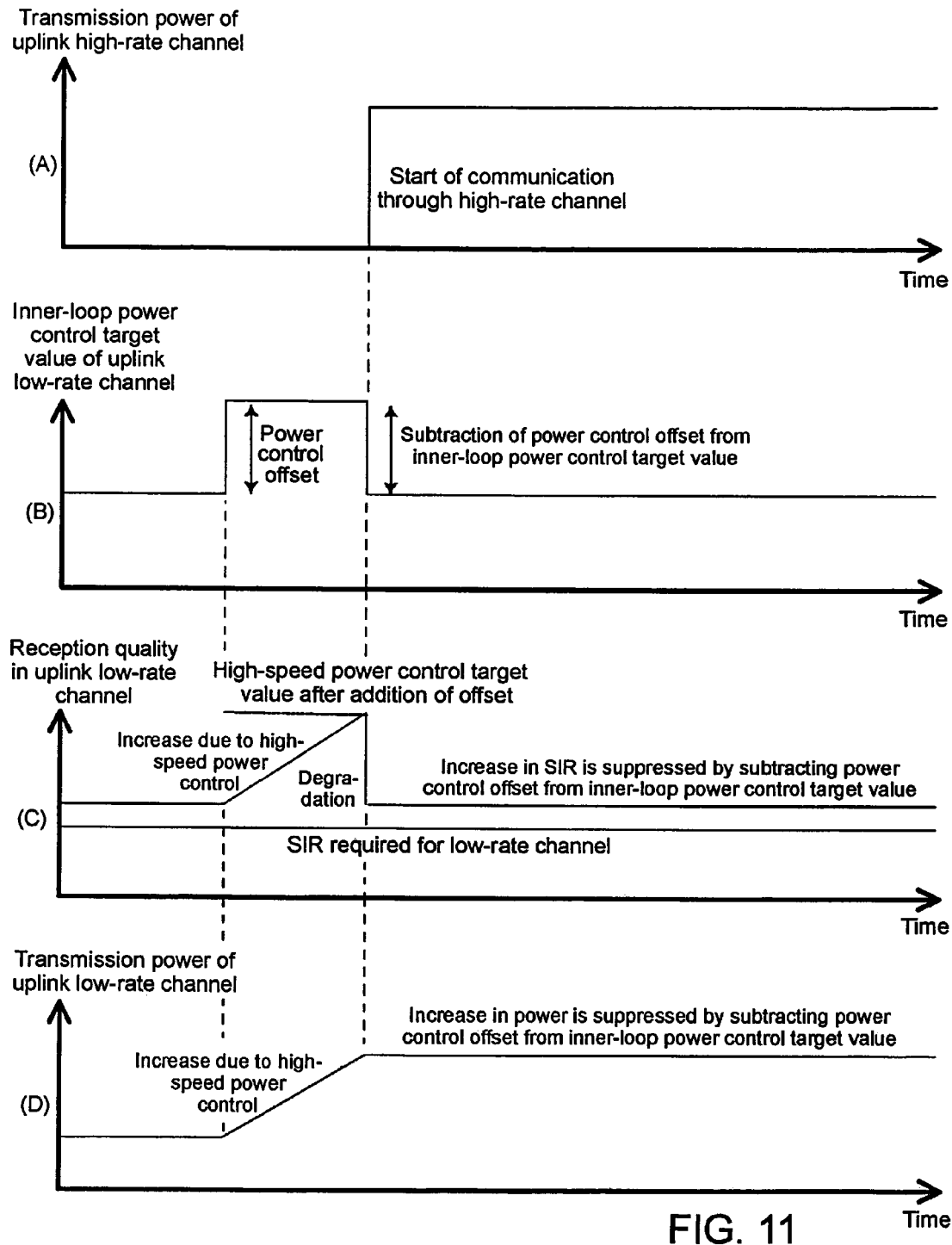
FIG. 11 is a graph showing changes in respective parameters in the radio communications system in the second embodiment.

FIG. 11 shows changes in parameters when the processes illustrated in FIGS. 9 and 10 are executed.

A change in the transmission power of the uplink high-rate channel is illustrated in (A) of FIG. 11. The transmission power, which is initially zero, rises with the start of a communication through the uplink high-rate channel at step S15 in FIG. 9 or FIG. 10, and subsequently levels off at a fixed value.

A change in the power control target value for the inner-loop power control in regard to the uplink low-rate channel transmitted by the radio communications device is illustrated in (B) of FIG. 11. The power control target value is increased by the power control offset during a period corresponding to step S12 in FIG. 9 or FIG. 10, i.e., during a period from the time the communication is started through the uplink high-rate channel to the time the waiting time has elapsed. Further, after the start of the communication through the uplink high-rate channel, the power control target value is decreased by the power control offset to return to the initial inner-loop power control target value, corresponding to step S23 in FIG. 9 or FIG. 10.

A change in the reception quality, detected at the radio base station, of the uplink low-rate channel through which the radio communications device makes a transmission is illustrated in (C) of FIG. 11. From a time the waiting time prior to the time at which a communication is started through the uplink high-rate channel to the time at which the uplink high-rate channel is started, the reception quality is improved on the low-rate communication channel. This attributable to the addition of the power control offset to the power control target value for the uplink inner-loop power control at step S12 in FIG. 9 or FIG. 10. The reception quality of the uplink low-rate channel is degraded with the start of a communication through the uplink high-rate channel. This degradation in the reception quality is attributable to an increase in interfering power caused by the uplink high-rate channel, and the like. However, since the reception quality of the uplink low-rate channel has been improved before the start of the communication through the uplink high-rate channel, the reception quality of the uplink low-rate channel will not fall short of a required reception quality even if it is degraded with the start of the communication through the uplink high-rate channel. While the inner-loop power control continues even after the start of the communication through the uplink high-rate channel, the inner-loop power control target value has returned to the initial inner-loop power control target value, corresponding to step S23 in FIG. 9 or FIG. 10, so that the reception quality of the low-rate channel is maintained near the initial inner-loop power control target value.

A change in the transmission power of the uplink low-rate channel transmitted by the radio communications device is illustrated in (D) of FIG. 11. The transmission power of the uplink low-rate channel begins ramping up the waiting time prior to the start of a communication through the uplink high-rate channel, and subsequently levels off at a fixed value. This is attributable to the addition of the power control offset to the power control target value for the inner-loop power control at step S12 in FIG. 9 or FIG. 10.

As shown in FIG. 11, in the second embodiment, the reception quality of the uplink low-rate channel will not fall short of a required reception quality with the start of a communication through the uplink high-rate channel.

In the second embodiment, the uplink high-rate channel control information may include information on a start timing of a communication through the uplink high-rate channel. In this alternative configuration, radio communications device 15 starts a communication through the uplink high-rate channel based on the information on the start timing which has been received as the uplink high-rate channel control information. Specifically, upon receipt of the information on the timing of starting a communication through the uplink high-rate channel through radio transceiver 40, control circuit 41 of radio communications device 15 starts a transmission of the uplink high-rate channel to radio base station 13 through radio transceiver 40 based on the received information on the start timing.

Further alternatively, in the second embodiment, radio network controller 11 can be configured to notify radio base station 1 of information on the start of a communication through the uplink high-rate channel. In this alternative configuration, radio base station 12 executes steps S12, S13, S23 in FIG. 9 or FIG. 10. By employing such a configuration, a communication through the uplink high-rate channel will less affect a communication through a communication channel of an adjacent radio base station.

The information on the start of a communication through the uplink high-rate channel may include at least one of a request for starting a communication through the uplink high-rate channel or a notice of the request for the start, the power control offset, a notice that the power control offset should be subtracted from the inner-loop power control target value, a notice that a communication has been started through the uplink high-rate channel, and a new power control target value.

At least one of the power control offset added to the inner-loop power control target value, and the new inner-loop power control target value may be generated by radio base station 12, or may be previously held in radio base station 12. The new inner-loop power control target value may be the same value for different radio communications devices or a different value for each of them.

Next, a description will be given of a third embodiment of the present invention. The hardware configuration of the radio communication system used herein is the same as the first embodiment described in connection with FIGS. 2 to 5. The third embodiment differs from the first embodiment in that the outer-loop power control is conducted between radio network controller 11 and radio base station 13. Also, assume in this embodiment that control circuit 21 of radio network controller 11 detects the communication quality of the uplink low-rate communication channel, and conducts an outer-loop power control between control circuit 21 and radio base station 13 through transmission/reception unit 20. The outer-loop power control adjusts the inner-loop power control target value based on the communication quality of the uplink low-rate channel and an outer-loop power control target value. Also, control circuit 31 of radio base station 13 conducts the outer-loop power control between control circuit 31 and radio network controller 11 through transmission/reception unit 32.

Preferably, the outer-loop power control can be a control as described below. Specifically, radio network controller 11 detects, at predetermined time intervals, the communication quality of the uplink low-rate channel transmitted by radio communications device 15 from a signal and/or information received from radio base station 13. Radio network controller 11 compares the detected reception quality with an outer-loop power control target value. When the detected communication quality exceeds the outer-loop power control target value, radio network controller 11 transmits to radio base station 13 an outer-loop power control signal which instructs radio base station 13 to set an inner-loop power control target value smaller than a current inner-loop power control target value for the uplink low-rate channel transmitted by radio communications device 15. On the other hand, when the detected communication quality falls short of the outer-loop power control target value, radio network controller 11 transmits radio base station 13 an outer-loop power control signal which instructs radio base station 13 to set an inner power control target value larger than the current inner-loop power control target value for the uplink low-rate channel transmitted by radio communications device 15. Radio base station 13 increases or decreases the inner-loop power control target value for the uplink low-rate channel transmitted by radio communications device 15 based on the outer-loop power control signal received from radio network controller 11. By repeating the foregoing control, the inner-loop power target value is adjusted such that the communication quality of the uplink low-rate channel transmitted by radio communications device 15 approaches a value near the outer-loop power control target value.

The uplink low-rate channel transmitted by radio communications device 14 can be controlled in a similar manner to the control for the uplink low-rate channel transmitted by radio communications device 15. Further, a similar control to that between radio network controller 11 and radio base station 13 can be conducted as well between radio network controller 11 and radio base station 12.

The communication quality of the uplink low-rate channel, and the outer-loop power control target value are preferably represented by a bit error rate, a frame error rate, a block error rate, CRC (Cyclic Redundancy Code), or the like. The reception quality of the uplink low-rate channel, and the inner-loop power control target value are preferably represented by a signal to interference ratio, a signal to interference ratio per bit (Eb/No), or the like.

Figure 12:
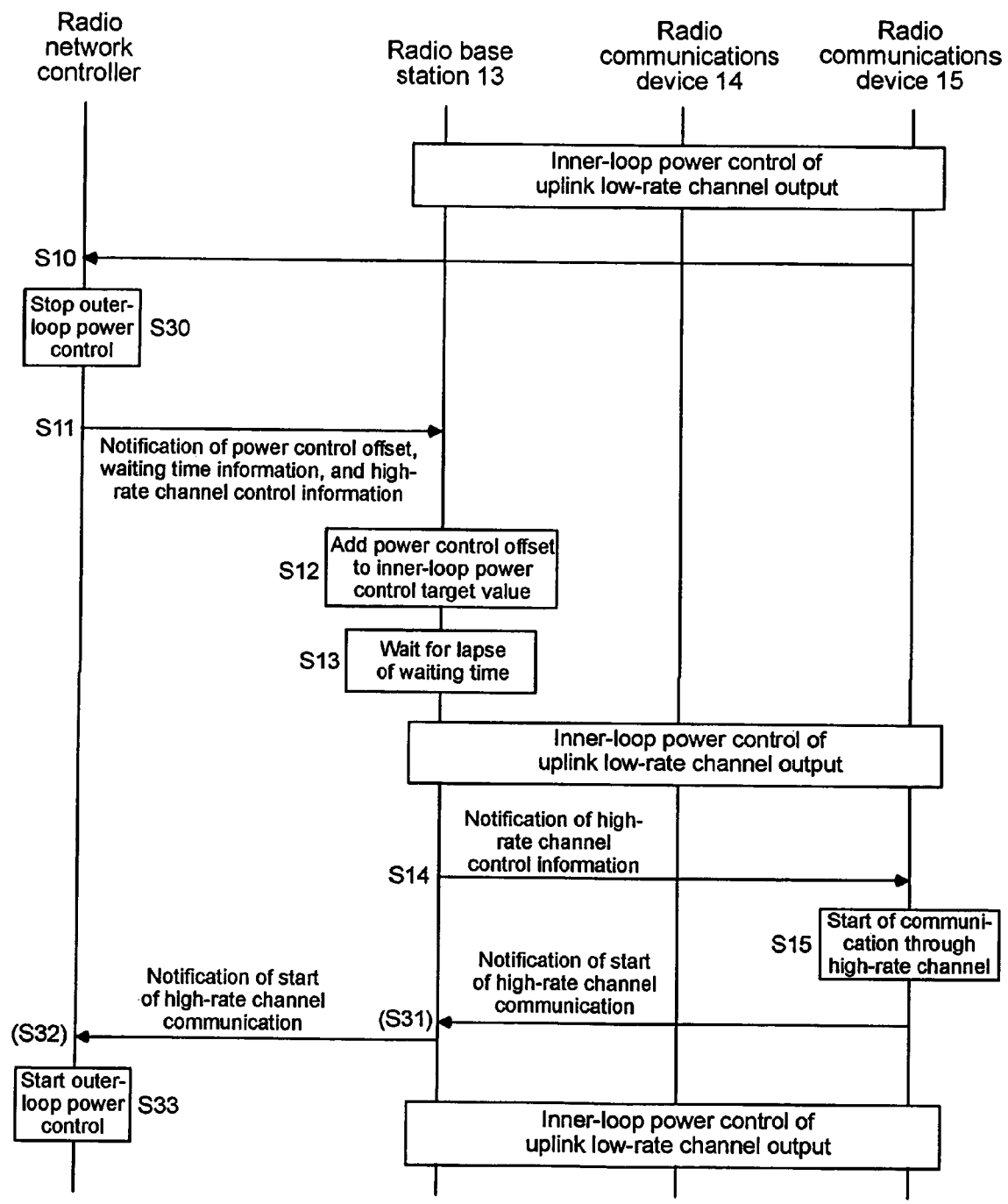
FIG. 12 is a sequence diagram illustrating an exemplary operation of the radio communications system in a third embodiment of the present invention.

FIG. 12 illustrates the operation of the radio communications system in the second embodiment.

From an initial state, irrespective of other operations, the inner-loop power control in regard to the uplink low-rate channel is continuously conducted between radio base station 13 and radio communications devices 14, 15. Also, from the initial state, the outer-loop power control in regard to the uplink low-rate channel is conducted between radio network controller 11 and radio base station 13. Here, steps S10 through S15 involve operations similar to those in the first embodiment illustrated in FIG. 6. However, radio network controller 11, when receiving information on a request for starting a communication through the uplink high-rate channel, stops the outer-loop power control in regard to the uplink low-rate channel. Specifically, control circuit 21 of radio network controller 11, which has received information on a request for starting a communication through the uplink high-rate channel, stops the outer-loop power control in regard to the uplink low-rate channel at step S30.

Radio communications device 15, which has started a communication through the uplink high-rate channel, notifies radio base station 13 at step S31 that radio communications device 15 has started the communication through the uplink high-rate channel. Upon receipt of the notice that radio communications device 15 has started the communication through the uplink high-rate channel, radio base station 13 transmits at step S23 to radio network controller 11 the notice that radio communication device 15 has started a communication through the uplink high-rate channel. Upon receipt of the notice that radio communication device 15 has started a communication through the uplink high-rate channel, radio network controller 11 starts the outer-loop power control in regard to the uplink low-rate channel. Specifically, control circuit 41 of radio communications device 15 transmits to radio base station 13 a notice that radio communications device 15 has started a communication through the uplink high-rate channel through radio transceiver 41. Control circuit 31 of radio base station 13 receives the notice that radio communications device 15 has started a communication through the uplink high-rate channel through radio transceiver 30. Control circuit 31 of radio base station 13 also transmits to radio network controller 11 the notice that radio communications device 15 has started a communication through the uplink high-rate channel through transmission/reception unit 31. Control circuit 21 of radio network controller 11 receives the notice that radio communications device 15 has started a communication through the uplink high-rate channel through transmission/reception unit 20, and starts the outer-loop power control in regard to the uplink low-rate channel.

The foregoing description has been given above that radio communications device 15 is configured to notify radio base station 13 that it has started a communication through the uplink high-rate channel. Alternatively, the notice that radio communications device 15 has started a communication through the uplink high-rate channel, from radio communications device 15, may pass through radio base station 13, and be directly transmitted to radio network controller 11. In this configuration, upon receipt of the notice of the start of a communication through the uplink high-rate channel from radio communications device 15, radio network controller 11 starts the outer-loop power control in regard to the uplink low-rate channel at step S33.

In the third embodiment, steps S31 through S32 can be omitted from the processing shown in FIG. 12. In this event, radio network controller 11 starts the outer-loop power control in regard to the uplink low-rate channel at step S33 when it recognizes the start of a communication through the uplink high-rate channel. Here, radio network control circuit 11 can be configured to recognize the start of a communication through the uplink high-rate channel, for example, based on the waiting time information.

Figure 13:
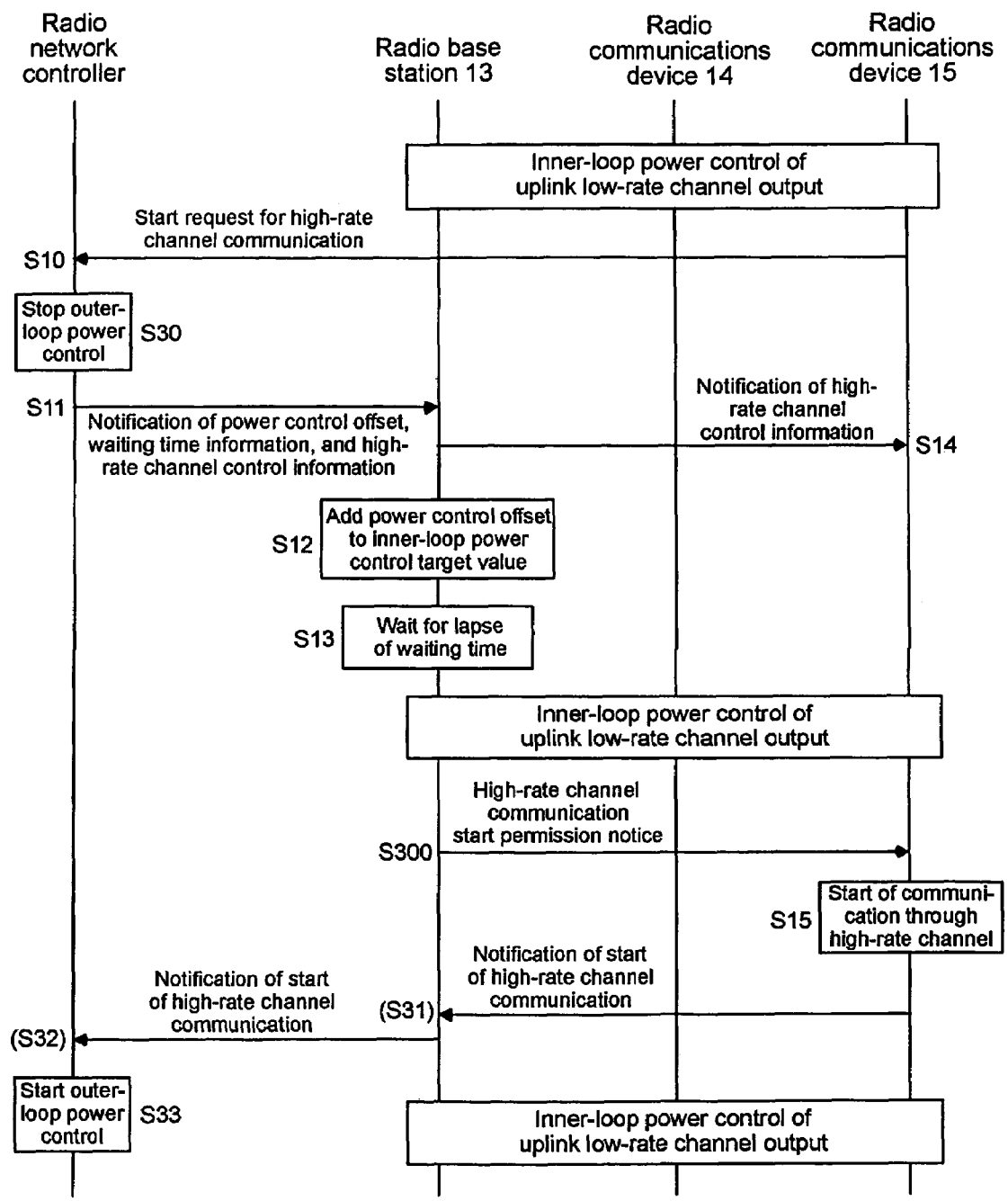
FIG. 13 is a sequence diagram illustrating another exemplary operation in the third embodiment.

In FIG. 12, a description has been given that radio base station 13 transmits the uplink high-rate channel control information to radio communications device 15, thereby permitting the same to start a communication through the uplink high-rate channel. Alternatively, as illustrated in FIG. 13, radio base station 13 can be configured to transmit an uplink high-rate channel communication start permission notice different from the uplink high-rate channel control information, to radio communications device 15, thereby permitting the same to start a communication through the uplink high-rate channel. In this alternative configuration, radio base station 13 transmits the uplink high-rate channel control information to radio communications device 15 at step S14 before the transmission of the uplink high-rate channel communication start permission notice. Radio base station 13 notifies radio communications device 15 of the uplink high-rate channel communication start permission notice after the lapse of the waiting time. Specifically, after the lapse of the waiting time, control circuit 31 of radio base station 13 transmits the uplink high-rate channel communication start permission notice to radio communications device 15 through radio transceiver 32 at step S300. Control circuit 41 of radio communications device 15 receives the uplink high-rate channel communication start permission notice through radio transceiver 40. Upon receipt of the uplink high-rate channel communication start permission notice, radio communications device 15 starts a communication through the uplink high-rate channel. Specifically, control circuit 41 of radio communications device 15, which has received the uplink high-rate channel communication start permission notice, starts a transmission of the uplink high-rate channel to radio base station 13 through radio transceiver 40 at step S15.

Figure 14:
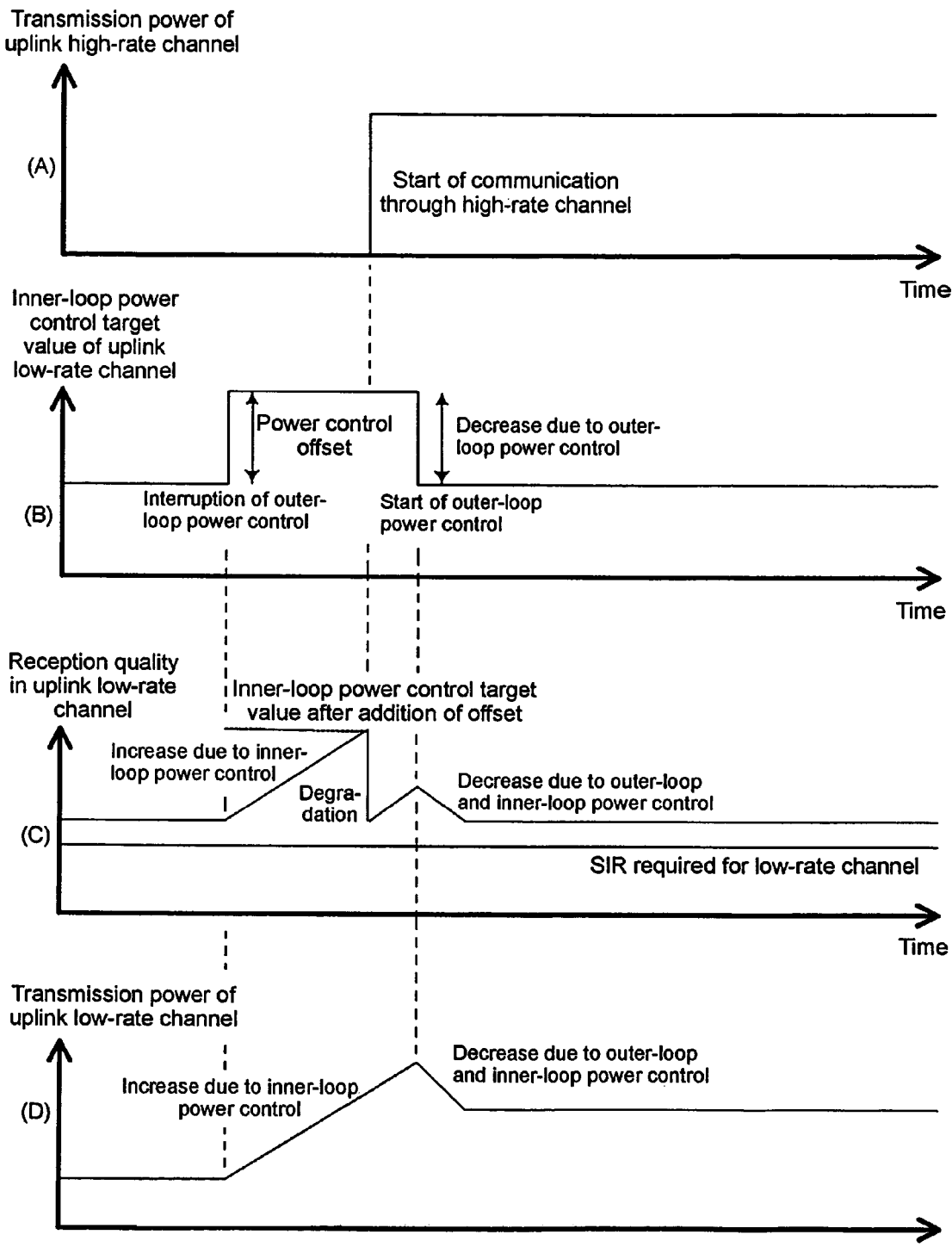
FIG. 14 is a graph showing changes in respective parameters in the radio communications system in the third embodiment.

FIG. 14 shows changes in respective parameters when the processes illustrated in FIGS. 12 and 13 are executed.

A change in the transmission power of the uplink high-rate channel is illustrated in (A) of FIG. 14. The transmission power, which is initially zero, rises with the start of a communication through the uplink high-rate channel at step S15 in FIG. 12 or FIG. 13, and subsequently levels off at a fixed value.

A change in the power control target value for the inner-loop power control in regard to the uplink low-rate channel transmitted by the radio communications device is illustrated in (B) of FIG. 14. The inner-loop power control target value is increased by the power control offset the waiting time prior to the time at which a communication through the uplink high-rate channel is started. Further, after the start of the communication through the uplink high-rate channel, the inner-loop power control target value is decreased by the power control offset to return to the initial inner-loop power control target value. The increase in the inner-loop power control target value is attributable to the addition of the power control offset at step S12 in FIG. 12 or FIG. 13, and the stop of the outer-loop power control at step S30 in FIG. 12 or FIG. 13. The decrease in the inner-loop power control target value is attributable to the start of the outer-loop power control at step S33.

A change in the reception quality at the radio base station on the uplink low-rate channel transmitted by the radio communications device is illustrated in (C) of FIG. 14. From a time the waiting time prior to the time at which a communication is started through the uplink high-rate channel to the time at which the uplink high-rate channel is started, the reception quality is improved on the low-rate channel. This is attributable to the addition of the power control offset to the power control target value for the uplink inner-loop power control at step S12 in FIG. 12 or FIG. 13. The reception quality of the uplink low-rate channel is degraded with the start of a communication through the uplink high-rate channel. This degradation in the reception quality is attributable to an increase in interfering power caused by the uplink high-rate channel, and the like. In this embodiment, however, since the reception quality of the uplink low-rate channel has been improved before the start of the communication through the uplink high-rate channel, the reception quality of the uplink low-rate channel will not fall short of a required reception quality even if it is degraded with the start of the communication through the uplink high-rate channel. While the inner-loop power control continues even after the start of the communication through the uplink high-rate channel, the inner-loop power control target value returns to the initial inner-loop power control target value due to the start of the outer-loop power control, which has been stopped, at step S33 in FIG. 12 or FIG. 13, so that the reception quality of the low-rate channel, though once excessively improved, is eventually maintained near the initial inner-loop power control target value.

A change in the transmission power of the uplink low-rate channel transmitted by the radio communications device is illustrated in (D) of FIG. 14. The transmission power of the uplink low-rate channel begins ramping up the waiting time prior to the start of a communication through the uplink high-rate channel, and is once excessively increased, but subsequently is decreased and levels off at a fixed value. The increase in the transmission power of the uplink low-rate channel is attributable to the addition of the power control offset to the power control target value for the inner-loop power control at step S12 in FIG. 12 or FIG. 13. The decrease in the transmission power of the uplink low-rate channel is attributable to the start of the outer-loop power control.

As shown in FIG. 14, in the third embodiment, the reception quality of the uplink low-rate channel will not fall short of a required reception quality with the start of a communication through the uplink high-rate channel.

In the third embodiment, the uplink high-rate channel control information may include information on a start timing of a communication through the uplink high-rate channel. In this alternative configuration, radio communications device 15 starts a communication through the uplink high-rate channel based on the information on the start timing which has been received as the uplink high-rate channel control information. Specifically, upon receipt of the information on the timing of starting a communication through the uplink high-rate channel through radio transceiver 40, control circuit 41 of radio communications device 15 starts a transmission of the uplink high-rate channel to radio base station 13 through radio transceiver 40 based on the received information on the start timing.

In the third embodiment, the power control offset is not subtracted from the inner-loop power control target value, to which the power control offset had been added, after the start of a communication through the uplink high-rate channel. Alternatively, in the third embodiment, the power control offset can also be subtracted from the inner-loop power control target value, to which the power control offset has been added, after the start of a communication through the uplink high-rate channel, or a new inner-loop power control target value can be set, as is the case in the second embodiment. Here, the new inner-loop power control target value may be the same value for different radio communications devices or a different value for each of them.

Further, the third embodiment may employ radio network controller 11 which is configured to notify radio base station 12 of information on the start of a communication through the uplink high-rate channel. In this alternative configuration, radio base station 12 executes steps S12, S13 in FIG. 12 or FIG. 13. Radio network controller 11 also executes steps S30, S33 in FIG. 12 or FIG. 13 for the outer-loop power control between radio base station 12 and the radio communications device. By employing such a configuration, a communication through the uplink high-rate channel will less affect a communication through a communication channel of an adjacent radio base station.

The information on the start of a communication through the uplink high-rate channel may include at least one of a request for starting a communication through the uplink high-rate channel or a notice of the request for the start, the power control offset, a notice that the power control offset should be subtracted from the inner-loop power control target value, a notice that a communication has been started through the uplink high-rate channel, and a new power control target value.

At least one of the power control offset added to the inner-loop power control target value, and the new inner-loop power control target value may be generated by radio base station 12, or may be previously held in radio base station 12.

Next, a description will be given of a fourth embodiment of the present invention. The hardware configuration of the radio communication system used herein is the same as the first embodiment described in connection with FIGS. 2 to 5. The fourth embodiment differs from the first embodiment in that radio network controller 11 is not involved in the operation in regard to the start of a communication through the uplink high-rate communication channel.

Figure 15:
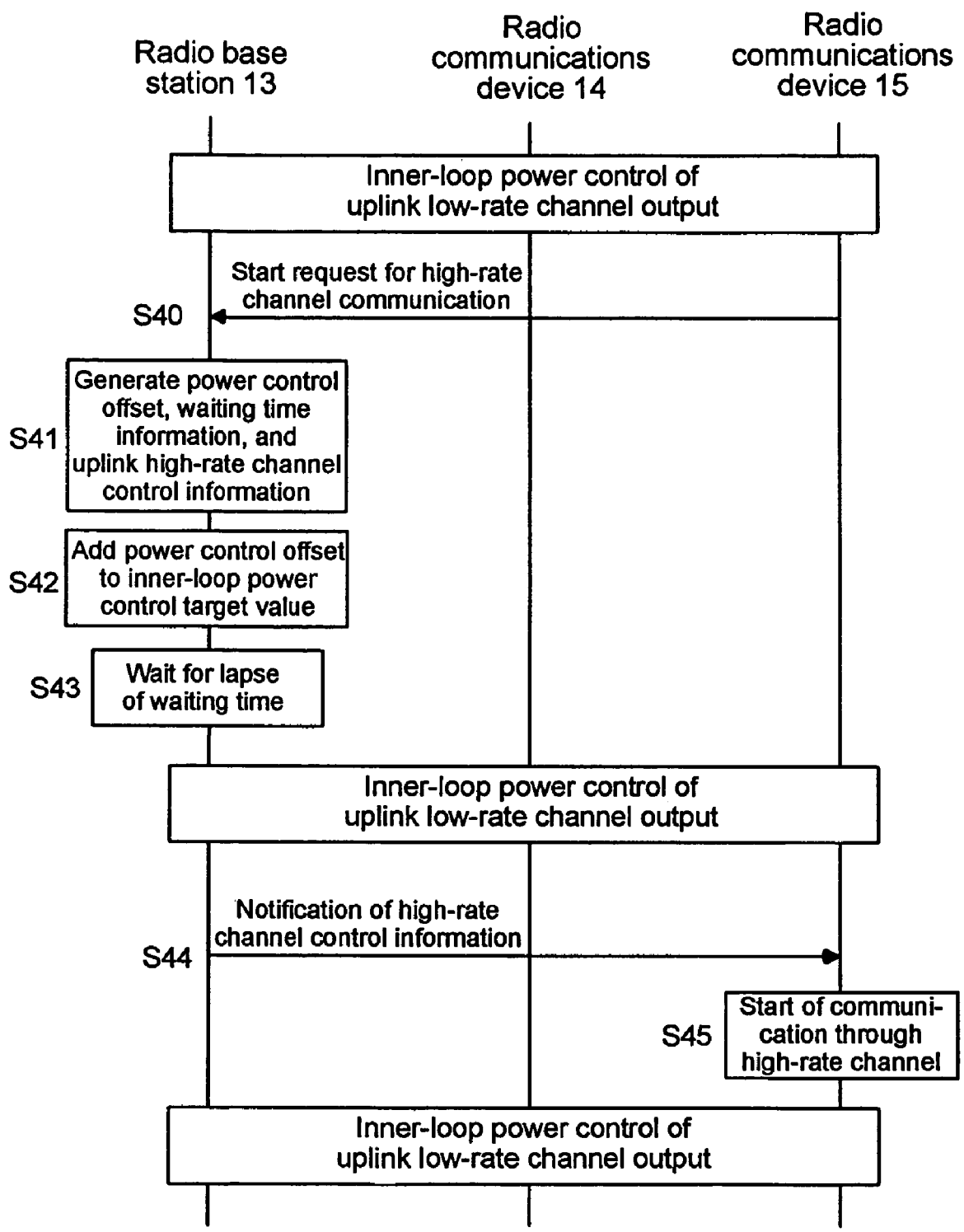
FIG. 15 is a sequence diagram illustrating an exemplary operation of the radio communications system in a fourth embodiment of the present invention.

FIG. 15 illustrates the operation of the radio communications system in the fourth embodiment.

From an initial state, irrespective of other operations, the inner-loop power control in regard to the uplink low-rate channel is continuously conducted between radio base station 13 and radio communications devices 14, 15. In this situation, radio communications device 15 notifies radio base station 13 of a request for starting a communication through the uplink high-rate channel. Specifically, control circuit 41 of radio communications device 15 transmits a start request to radio base station 13 through radio transceiver 40 at step S40. Control circuit 31 of radio base station 13 receives the transmitted start request through radio transceiver 30.

Upon receipt of the start request, radio base station 13 generates a power control offset, waiting time information, and uplink high-rate channel control information at step S41. Specifically, control circuit 31 of radio base station 13 generates a power control offset, waiting time information, and uplink high-rate communication channel control information. Control circuit 31 of radio base station 13 adds the power control offset to a power control target value for the inner-loop power control in regard to the uplink low-rate channel at step S42.

Here, the same power control offset may be added or different power control offsets may be added to the respective inner-loop power control target values associated with radio communications devices 14, 15.

The inner-loop power control from step S42 onward controls the transmission power of the uplink low-rate channel based on the inner-loop power control target value to which the power control offset has been added. After step S42, control circuit 31 of radio base station 13 waits for a waiting time at step S43. However, even during the waiting time, the inner-loop power control is continuously conducted between radio base station 13 and radio communications devices 14, 15. After the lapse of the waiting time, radio base station 13 starts a communication with radio communications device 15 through the uplink high-rate channel. Specifically, after the lapse of the waiting time, control circuit 31 of radio base station 13 transmits uplink high-rate channel control information to radio communications device 15 through radio transceiver 30 as information for the communication through the uplink high-rate channel at step S44. Control circuit 41 of radio communications device 15 receives the uplink high-rate channel control information through radio transceiver 40. Control circuit 41 of radio communications device 15, which has received the uplink high-rate channel control information, starts a transmission through the uplink high-rate channel to radio base station 13 at step S45.

In FIG. 15, radio base station 13 generates the power control offset, waiting time information, and uplink high-rate channel control information. Alternatively, radio base station 13 may be configured to previously hold at least one of the power control offset, waiting time information, and uplink high-rate channel control information.

Figure 16:
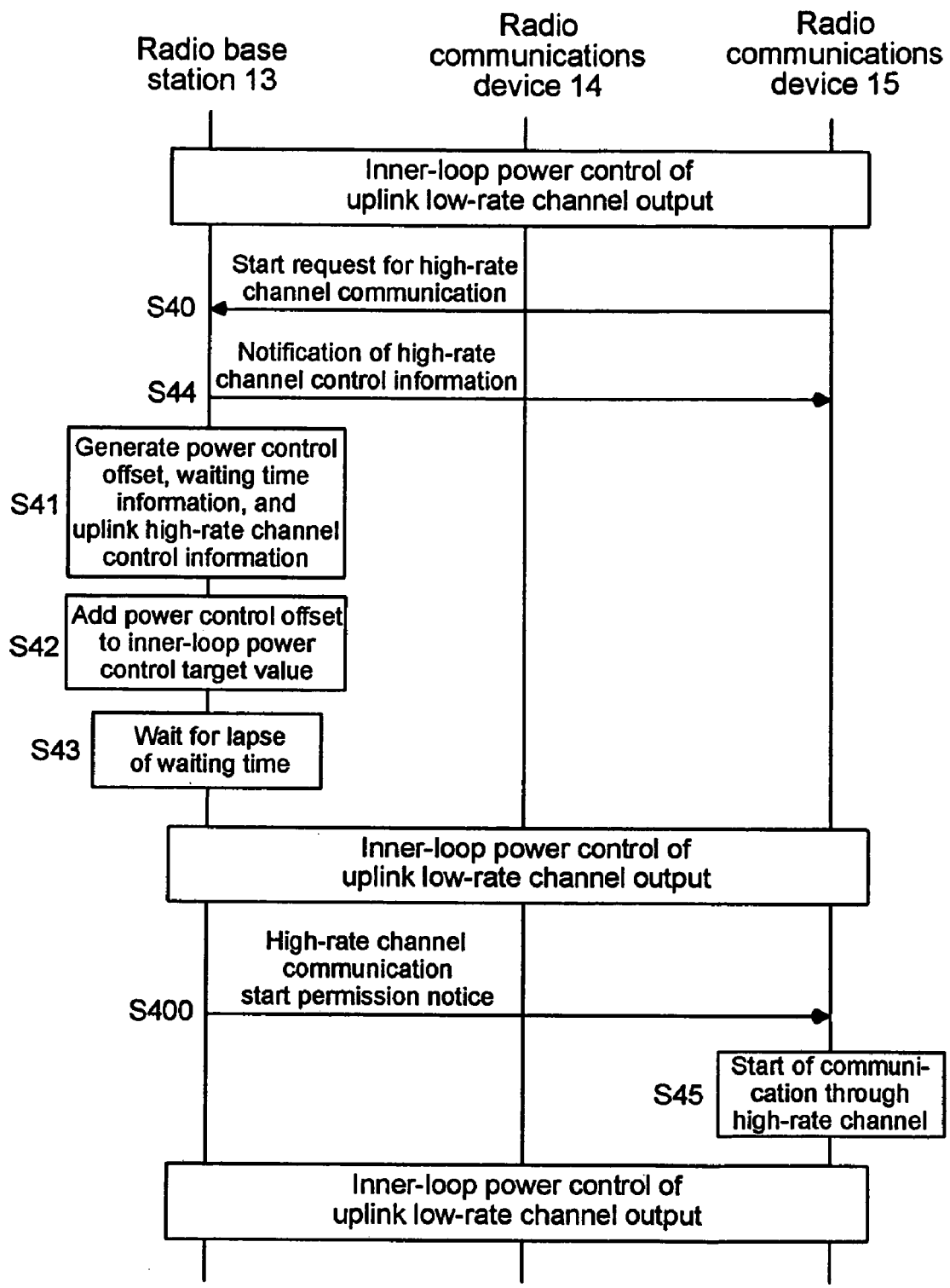
FIG. 16 is a sequence diagram illustrating another exemplary operation in the fourth embodiment.

In FIG. 15, radio base station 13 transmits the uplink high-rate channel control information to radio communications device 15, permitting the same to start a communication through the uplink high-rate channel. Alternatively, as illustrated in FIG. 16, radio base station 13 may transmit an uplink high-rate channel start permission notice different from the uplink high-rate channel control information to radio communications device 15, thereby permitting the same to start a communication through the uplink high-rate channel. In this alternative configuration, radio base station 13 transmits the uplink high-rate channel control information to radio base station 15 at step S44 prior to the transmission of the uplink high-rate channel communication start permission notice.

After the lapse of the waiting time, radio base station 13 notifies radio communications device 15 of the uplink high-rate channel communication start permission notice. Specifically, after the lapse of the waiting time, control circuit 31 of radio base station 13 transmits the uplink high-rate channel communication start permission notice to radio communications device 15 through radio transceiver 32 at step 400. Control circuit 41 of radio communications device 15 receives the uplink high-rate channel communication start permission notice through radio transceiver 40. Upon receipt of the uplink high-rate channel communication start permission notice, radio communications device 15 starts a communication through the uplink high-rate channel. Specifically, control circuit 41 of radio communications device 15, which has received the uplink high-rate channel communication permission notice, starts a transmission through the uplink high-rate channel to radio base station 13 through radio transceiver 40 at step 45.

When the processes illustrated in FIGS. 15 and 16 are executed, respective parameters of the radio communications system change in a similar manner to those shown in FIG. 8 in the first embodiment.

Specifically, a change in the transmission power of the uplink high-rate channel is also shown by (A) of FIG. 8 in the fourth embodiment. The transmission power, which is initially zero, rises with the start of a communication through the high-rate channel at step S45 in FIG. 15 or FIG. 16, and subsequently levels off at a fixed value.

A change in the power control target value for the inner-loop power control in regard to the uplink channel transmitted by the radio communications device is illustrated in (B) of FIG. 8. The inner-loop power control target value is increased by the power control offset corresponding to step S42 in FIG. 15 or FIG. 16, at a time the waiting time prior to the time at which a communication through the uplink high-rate channel is started.

A change in the reception quality, detected at radio base station 13, of the uplink low-rate channel transmitted by the radio communications device is illustrated in (C) of FIG. 8. From a time the waiting time prior to the time at which a communication is started through the uplink high-rate channel to the time at which the uplink high-rate channel is started, the reception quality is improved on the low-rate communication channel. This is attributable to the addition of the power control offset to the power control target value for the uplink inner-loop power control at step S42 in FIG. 15 or FIG. 16. The reception quality of the uplink low-rate channel is degraded with the start of a communication through the uplink high-rate channel. This degradation in the reception quality is attributable to an increase in interfering power caused by the uplink high-rate, and the like. However, since the reception quality of the uplink low-rate channel has been improved before the start of the communication through the uplink high-rate channel, the reception quality of the uplink low-rate channel will not fall short of a required reception quality even if it is degraded with the start of the communication through the uplink high-rate channel. After starting the communication through the uplink high-rate channel, the reception quality of the low-rate channel is again improved by the inner-loop power control.

A change in the transmission power of the uplink low-rate channel transmitted by the radio communications device is illustrated in (D) of FIG. 8. The transmission power of the uplink low-rate channel begins ramping up the waiting time prior to the start of a communication through the uplink high-rate channel, and subsequently levels off at a fixed value.

This is attributable to the addition of the power control offset to the power control target value for the inner-loop power control at step S42 in FIG. 15 or FIG. 16.

As shown in FIG. 8, the reception quality of the uplink low-rate channel will not fall short of a required reception quality with the start of a communication through the uplink high-rate channel in the fourth embodiment as well.

In the fourth embodiment, the uplink high-rate channel control information may include information on a start timing of a communication through the uplink high-rate channel. In this alternative configuration, radio communications device 15 starts a communication through the uplink high-rate channel based on the information on the start timing which has been received as the uplink high-rate channel control information. Specifically, upon receipt of the information on the timing of starting a communication through the uplink high-rate channel through radio transceiver 40, control circuit 41 of radio communications device 15 starts a transmission of the uplink high-rate channel to radio base station 13 through radio transceiver 40 based on the received information on the start timing.

Further alternatively, the fourth embodiment may employ radio base station 13 which is configured to notify radio base station 12 of information on the start of a communication through uplink high-rate channel directly or through radio network controller 11. In this alternative configuration, radio base station 12 adds the power control offset to the power control target value for the inner-loop power control. By employing this configuration, a communication through the uplink high-rate channel will less affect a communication through a communication channel of an adjacent radio base station.

The information on the start of a communication through the uplink high-rate channel may include at least one of a request for starting a communication through the uplink high-rate channel or a notice of the request for the start, and the power control offset.

The power control offset added to the inner-loop power control target value may be generated by radio base station 12, or may be previously held in radio base station 12.

Next, a description will be given of a fifth embodiment of the present invention. The hardware configuration of the radio communication system used herein is the same as the first embodiment described in connection with FIGS. 2 to 5. The fifth embodiment differs from the radio communications system of the second embodiment in that radio network controller 11 is not involved in the operation relating to the start of a communication through the uplink high-rate channel, and differs from the radio communications system of the fourth embodiment in that the power control offset is subtracted from the inner-loop power control target value, to which the power control offset has been added, after the start of a communication through the uplink high-rate channel.

Figure 17:
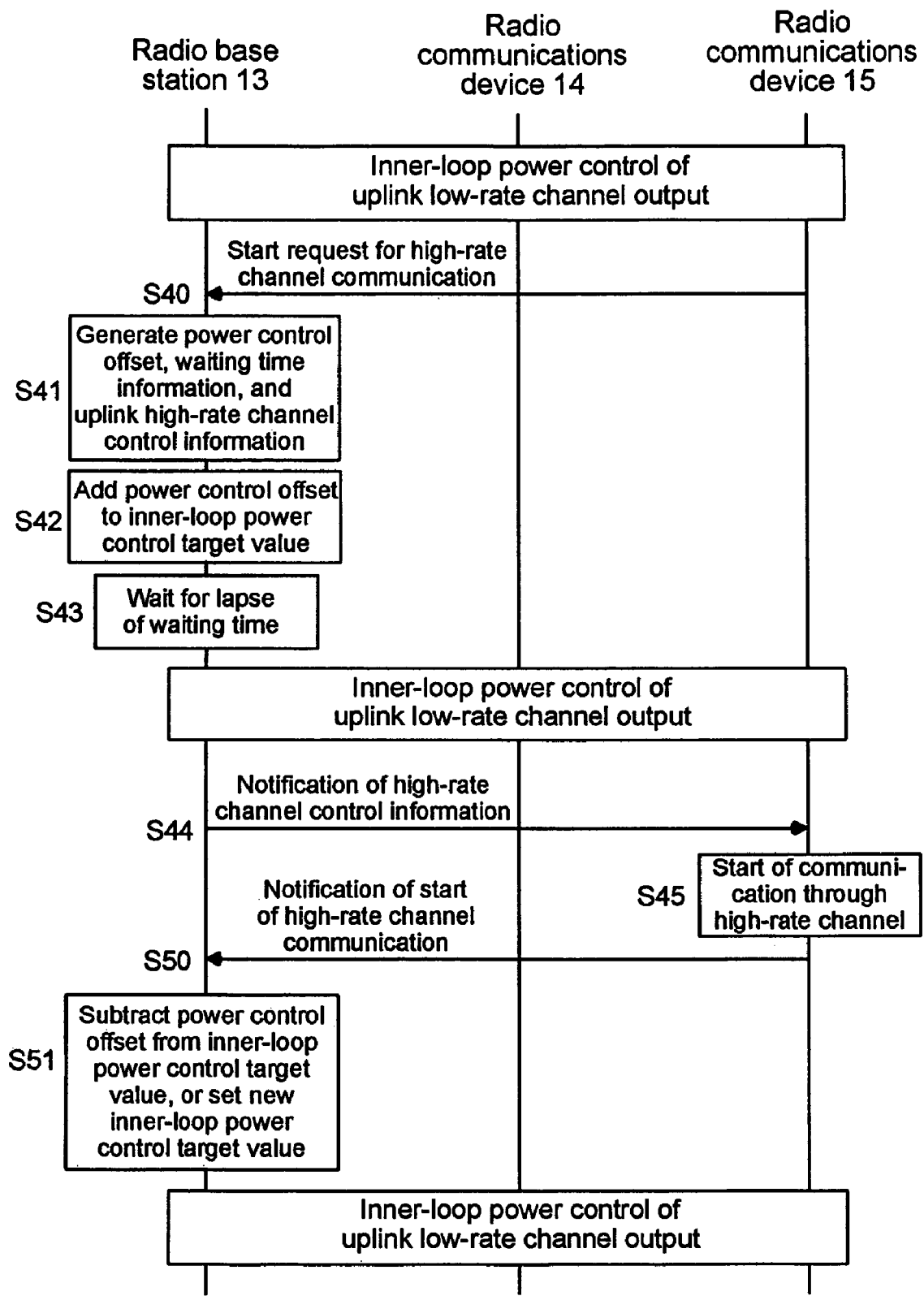
FIG. 17 is a sequence diagram illustrating an exemplary operation of the radio communications system in a fifth embodiment of the present invention.

FIG. 17 illustrates the operation of the radio communications system in the fifth embodiment. In FIG. 17, steps S40 through S45 are similar to those shown in FIG. 15 in the fourth embodiment.

After starting a communication through the uplink high-rate channel at step 45, radio communications device 15 notifies radio base station 13 at step S50 that it has started the communication through the uplink high-rate channel. Upon receipt of the notice that radio communications device 15 has started a communication through the uplink high-rate channel, radio base station 13 subtracts the power control offset from the inner-loop power control target value to which the power control offset has been added, or sets a new inner-loop power control target value at step S51. Specifically, control circuit 41 of radio communications device 15 transmits to radio base station 13 a notice that radio communications device 15 has started a communication through the uplink high-rate channel through radio transceiver 40. Control circuit 31 of radio base station 13 receives the notice that radio communications device 15 has started a communication through the uplink high-rate channel through radio transceiver 30. Control circuit 31 of radio base station 13, which has received the notice that radio communications device 15 has started a communication, subtracts the power control offset from the inner-loop power control target value to which the power control offset has been added, or sets a new inner-loop power control target value.

Here, a description has been given of radio communications device 15 which is configured to notify radio base station 13 that it has started a communication through the uplink high-rate channel. Alternatively, step S50 may be omitted. In this event, upon recognition of the start of a communication through the uplink high-rate channel, radio base station 13 subtracts the power control offset from the inner-loop power control target value to which the power control offset has been added, or sets a new inner-loop power control target value at step S51. Preferably, radio base station 13 can recognize the start of a communication through the uplink high-rate channel based on the waiting time information.

Here, the new inner-loop power control target value can be the same value for both radio communications devices 14, 15 or a different value for each of radio communications devices 14, 15.

Figure 18:
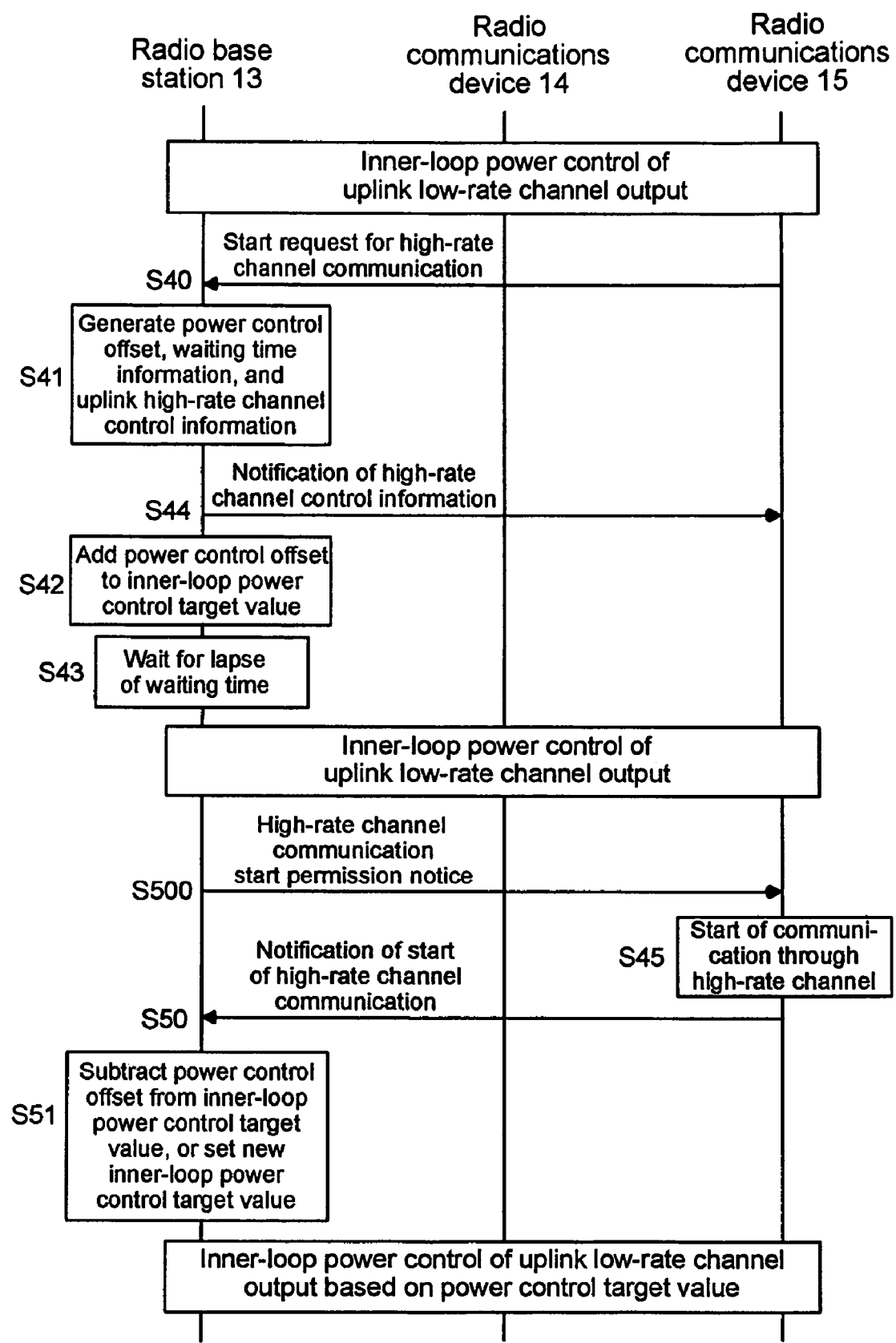
FIG. 18 is a sequence diagram illustrating another exemplary operation in the fifth embodiment.

In FIG. 17, radio base station 13 transmits the uplink high-rate channel control information to radio communications device 15, thereby permitting the same to start a communication through the uplink high-sped channel. Alternatively, as illustrated in FIG. 18, radio base station 13 may transmit to radio communications device 15 an uplink high-rate channel communication start permission notice different from the uplink high-rate channel control information, thereby permitting radio communications device 15 to start a communication through the uplink high-rate channel. In this configuration, radio base station 13 transmits the uplink high-rate channel control information to radio base station 15 at step S44 prior to the transmission of the uplink high-rate channel communication start permission notice. After the lapse of the waiting time, radio base station 13 notifies radio communications device 15 of the uplink high-rate channel communication start permission notice. Specifically, after the lapse of the waiting time, control circuit 31 of radio base station 13 transmits the uplink high-rate channel communication start permission notice to radio communications device 15 through radio transceiver 32 at step S500. Control circuit 41 of radio communications device 15 receives the uplink high-rate channel communication start permission notice through radio transceiver 40. Upon receipt of the uplink high-rate channel communication start permission notice, radio communications device 15 starts a communication through the uplink high-rate channel. Specifically, control circuit 41 of radio communications device 15, which has received the uplink high-rate channel communication start permission notice, starts a transmission of the uplink high-rate channel to radio base station 13 through radio transceiver 40 at step 45.

When the processes illustrated in FIGS. 17 and 18 are executed, the respective parameters of the radio communications system change in a manner similar to those shown in FIG. 11 in the second embodiment.

Specifically, a change in the transmission power of the uplink high-rate channel is shown by (A) of FIG. 11 in the fifth embodiment as well. The transmission power, which is initially zero, rises with the start of a communication through the high-rate channel at step S45 in FIG. 17 or FIG. 18, and subsequently levels off at a fixed value.

A change in the power control target value for the inner-loop power control in regard to the uplink low-rate channel transmitted by the radio communications device is illustrated in (B) of FIG. 11. The inner-loop power control target value is increased by the power control offset corresponding to step S42 in FIG. 17 or FIG. 18, at a time the waiting time prior to the time at which radio communications device 15 starts a communication through the uplink high-rate channel. Further, after the start of the communication through the uplink high-rate channel, the inner-loop power control target value is decreased by the power control offset to return to the initial inner-loop power control target value, corresponding to step S51 in FIG. 17 or FIG. 18.

A change in the reception quality at the radio base station on the uplink low-rate channel transmitted by the radio communications device is illustrated in (C) of FIG. 11. From a time the waiting time prior to the time at which a communication is started through the uplink high-rate channel to the time at which the uplink high-rate channel is started, the reception quality is improved on the low-rate communication channel. This is attributable to the addition of the power control offset to the power control target value for the uplink inner-loop power control at step S42 in FIG. 17 or FIG. 18. The reception quality of the uplink low-rate channel is degraded with the start of a communication through the uplink high-rate channel. This degradation in the reception quality is attributable to an increase in interfering power caused by the uplink high-rate channel, and the like. However, since the reception quality of the uplink low-rate channel has been improved before the start of the communication through the uplink high-rate channel, the reception quality of the uplink low-rate channel will not fall short of a required reception quality even if it is degraded with the start of the communication through the uplink high-rate channel. While the inner-loop power control continues even after the start of the communication through the uplink high-rate channel, the inner-loop power control target value has returned to the initial inner-loop power control target value, corresponding to step S51 in FIG. 17 or FIG. 18, so that the reception quality of the low-rate communication channel is maintained near the initial inner-loop power control target value.

A change in the transmission power of the uplink low-rate channel transmitted by the radio communications device is illustrated in (D) of FIG. 11. The transmission power of the uplink low-rate channel begins ramping up the waiting time prior to the start of a communication through the uplink high-rate channel, and subsequently levels off at a fixed value. This is attributable to the addition of the power control offset to the power control target value for the inner-loop power control at step S42 in FIG. 17 or FIG. 18.

As shown in FIG. 11, the reception quality of the uplink low-rate channel will not fall short of a required reception quality with the start of a communication through the uplink high-rate channel in the fifth embodiment as well.

In the fifth embodiment, the uplink high-rate channel control information may include information on a start timing of a communication through the uplink high-rate channel. In this alternative configuration, radio communications device 15 starts a communication through the uplink high-rate channel based on the information on the start timing which has been received as the uplink high-rate channel control information. Specifically, upon receipt of the information on the timing of starting a communication through the uplink high-rate channel through radio transceiver 40, control circuit 41 of radio communications device 15 starts a transmission of the uplink high-rate channel to radio base station 13 through radio transceiver 40 based on the received information on the start timing.

Further alternatively, the fifth embodiment may employ radio base station 13 which is configured to notify radio base station 12 of information on the start of a communication through the uplink high-rate channel directly or through radio network controller 11. In this alternative configuration, radio base station 12 executes steps S42, S43, S51 in FIG. 17 or FIG. 18. By employing such a configuration, a communication through the uplink high-rate channel will less affect a communication through a communication channel of an adjacent radio base station.

The information on the start of a communication through the uplink high-rate channel may include at least one of a request for starting a communication through the uplink high-rate channel or a notice of the request for the start, the power control offset, a notice that the power control offset should be subtracted from the inner-loop power control target value, a notice that a communication through the uplink high-rate channel has been started, and a new power control target value.

At least one of the power control offset added to the inner-loop power control target value, and the new inner-loop power control target value may be generated by radio base station 12, or may be previously held in radio base station 12.

Next, a description will be given of a sixth embodiment of the present invention. The hardware configuration of the radio communication system used herein is the same as the first embodiment described in connection with FIGS. 2 to 5. However, control circuit 21 of radio network controller 11 detects the communication quality of the uplink low-rate channel to conduct the outer-loop power control between control circuit 21 and radio base station 13 through transmission/reception unit 20. The outer-loop power control adjusts an inner-loop power control target value based on the communication quality on the uplink low-rate channel and an outer-loop power control target value. Control circuit 31 of radio base station 13 also conducts the outer-loop power control between control circuit 31 and radio network controller 11 through transmission/reception unit 32. The radio communications system of the sixth embodiment differs from the radio communications system of the third embodiment in that radio network controller 11 is not involved in the operation relating to the start of a communication through the uplink high-rate channel, and differs from the fourth embodiment in that radio base station 13 conducts the outer-loop power control between radio base station 13 and radio network controller 11.

Figure 19:
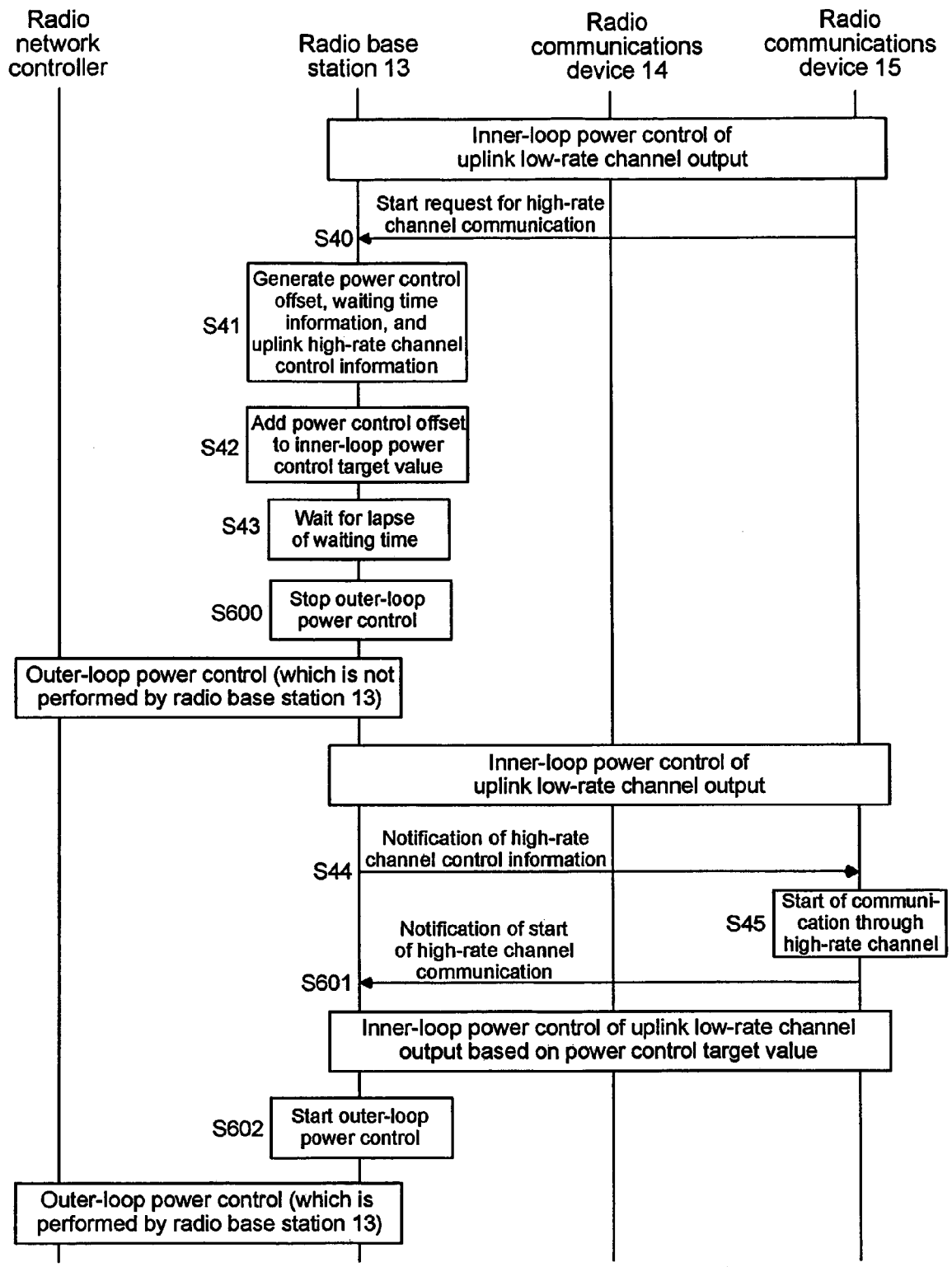
FIG. 19 is a sequence diagram illustrating an exemplary operation of the radio communications system in a sixth embodiment of the present invention.

FIG. 19 illustrates the operation of the radio communications network in the sixth embodiment.

From an initial state, irrespective of other operations, the inner-loop power control in regard to the uplink low-rate channel is continuously conducted between radio base station 13 and radio communications devices 14, 15. Also, from the initial state, the outer-loop power control in regard to the uplink low-rate channel is conducted between radio network controller 11 and radio base station 13. Steps S40 through S45 in FIG. 19 are similar to those shown in FIG. 15 in the fourth embodiment. However, at step S42, a power control offset is added to a power control target value for the inner-loop power control in regard to the low-rate channel. Also, radio base station 13, which is in a waiting state as shown in step S43, stops the outer-loop power control in regard to the uplink low-rate channel. Specifically, control circuit 21 stops the outer-loop power control in regard to the uplink low-rate channel at step S600. Preferably, even if control circuit 21 receives information on the outer-loop power control from radio network controller 11, control circuit 21 does not reflect the received information on the outer-loop power control to the adjustment of the inner-loop power control target value, i.e., keeps the inner-loop power control target value constant, thereby making it possible to stop the outer-loop power control.

Radio communications device 15, which has started a communication through the uplink high-rate channel, notifies, at step S601, radio base station 13 that it has started the communication through the uplink high-rate channel. Upon receipt of the notice that radio communications device 15 has started a communication through the uplink high-rate channel, radio base station 13 starts the outer-loop power control in regard to the uplink low-rate channel. Specifically, control circuit 41 of radio communications device 15 transmits to radio base station 13, through radio transceiver 40, a notice that radio communications device 15 has started a communication through the uplink high-rate channel. Control circuit 31 of radio base station 13 receives, through radio transceiver 300, the notice that radio communications device 15 has started a communication through the uplink high-rate channel. Further, control circuit 31 of radio base station 13 starts the outer-loop power control in regard to the uplink low-rate channel at step S602.

Here, a description has been made that radio communications device 15 notifies radio base station 13 at step 601 that it has started a communication through the uplink high-rate channel. However, step S601 may be omitted. In this event, radio base station 13 starts the outer-loop power control in regard to the uplink low-rate channel at step S602 upon recognition of the start of a communication through the uplink high-rate channel. Here, radio base station 13, for example, can be configured to recognize the start of a communication through the uplink high-rate channel based on the waiting time information.

Figure 20:
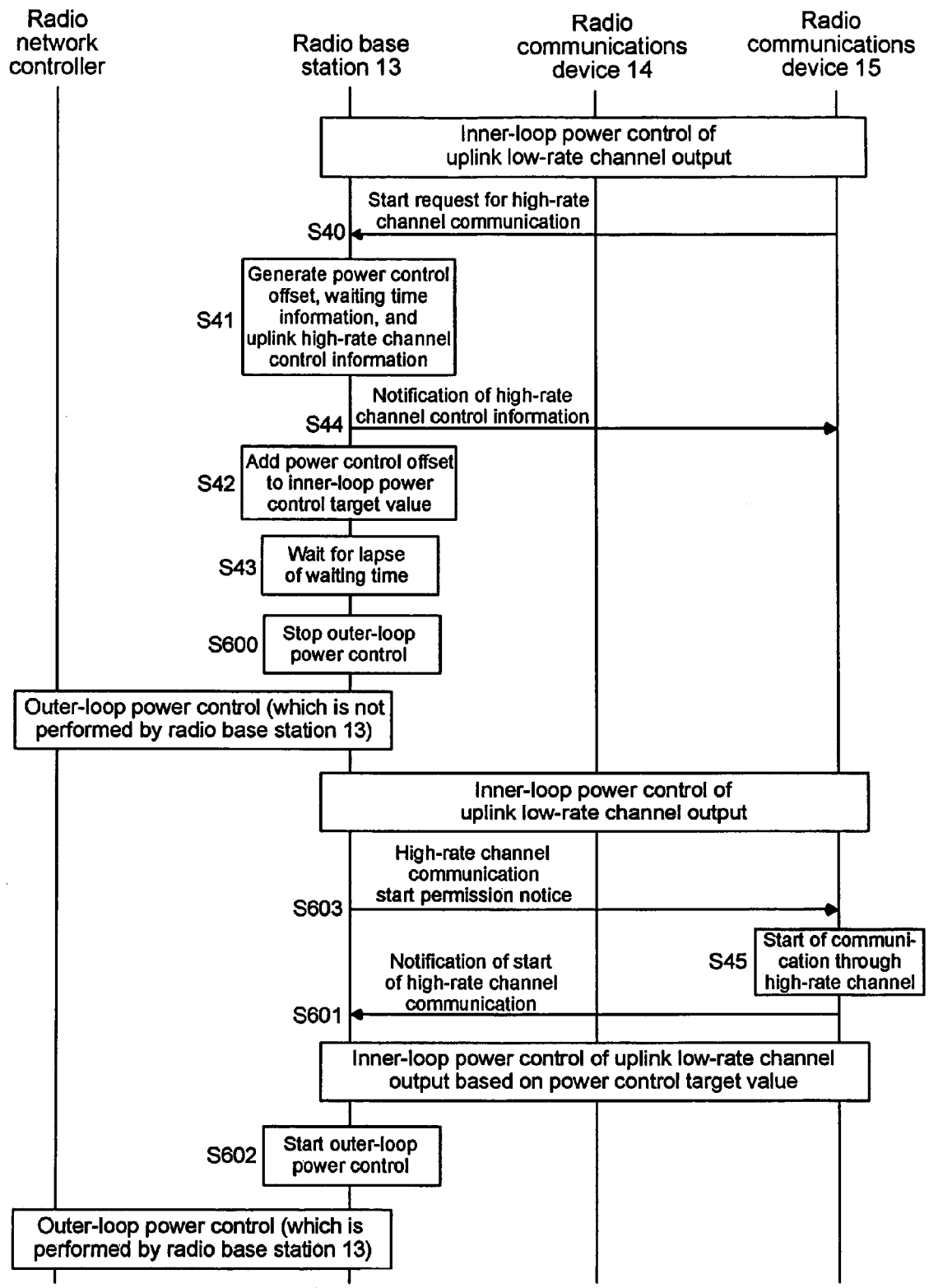
FIG. 20 is a sequence diagram illustrating another exemplary operation in the sixth embodiment.

In FIG. 19, a description has been given that radio base station 13 transmits the uplink high-rate channel control information to radio communications device 15, thereby permitting the same to start a communication through the uplink high-rate channel. Alternatively, as illustrated in FIG. 20, radio base station 13 can be configured to transmit an uplink high-rate channel communication start permission notice, different from the uplink high-rate channel control information, to radio communications device 15, thereby permitting the same to start the communication through the uplink high-rate channel. In this event, radio base station 13 transmits the uplink high-rate channel control information to radio communications device 15 at step S44 before the transmission of the uplink high-rate channel communication start permission notice. Radio base station 13 notifies radio communications device 15 of the uplink high-rate channel communication start permission notice after the lapse of the waiting time at step S603. Specifically, after the lapse of the waiting time, control circuit 31 of radio base station 13 transmits the uplink high-rate channel communication start permission notice to radio communications device 15 through radio transceiver 32. Control circuit 41 of radio communications device 15 receives the uplink high-rate channel communication start permission notice through radio transceiver 40. Upon receipt of the uplink high-rate channel communication start permission notice, radio communications device 15 starts a communication through the uplink high-rate channel. Specifically, control circuit 41 of radio communications device 15, which has received the uplink high-rate channel communication start permission notice, starts a transmission of the uplink high-rate channel to radio base station 13 through radio transceiver 40.

When the processes illustrated in FIGS. 19 and 20 are executed, the respective parameters of the radio communications system change in a similar manner to those of the third embodiment shown in FIG. 14.

A change in the transmission power of the uplink high-rate channel is also shown by (A) of FIG. 14 in the sixth embodiment. The transmission power, which is initially zero, rises with the start of a communication through the uplink high-rate channel at step S45 in FIG. 19 or FIG. 20, and subsequently levels off at a fixed value.

A change in the power control target value for the inner-loop power control in regard to the uplink low-rate channel transmitted by the radio communications device is illustrated in (B) of FIG. 14. The inner-loop power control target value is increased by the power control offset at a time the waiting time prior to the time at which a communication through the uplink high-rate channel is started. Further, after the start of the communication through the uplink high-rate channel, the inner-loop power control target value is decreased by the power control offset to return to the initial inner-loop power control target value. The increase in the inner-loop power control target value is attributable to the addition of the power control offset at step S42 in FIG. 18 or FIG. 19, and the interruption of the outer-loop power control at step S602 in FIG. 19 or FIG. 20. The decrease in the inner-loop power control target value is attributable to the start of the outer-loop power control at step S602 in FIG. 19 or FIG. 20.

A change in the reception quality at the radio base station on the uplink low-rate channel through which the radio communications device makes a transmission is illustrated in (C) of FIG. 14. From a time the waiting time prior to the time at which a communication is started through the uplink high-rate channel to the time at which the uplink high-rate channel is started, the reception quality is improved on the low-rate communication channel. This is attributable to the addition of the power control offset to the power control target value for the uplink inner-loop power control at step S42 in FIG. 19 or FIG. 20. The reception quality of the uplink low-rate channel is degraded with the start of a communication through the uplink high-rate channel. This degradation in the reception quality is attributable to an increase in interfering power caused by the uplink high-rate channel, and the like. However, since the reception quality of the uplink low-rate channel has been improved before the start of the communication through the uplink high-rate channel, the reception quality of the uplink low-rate channel will not fall short of a required reception quality even if it is degraded with the start of the communication through the uplink high-rate channel. While the inner-loop power control continues even after the start of the communication through the uplink high-rate channel, the inner-loop power control target value returns to the initial inner-loop power control target value due to the start of the outer-loop power control, which has been interrupted, at step S602 in FIG. 19 or FIG. 20, so that the reception quality of the low-rate channel, though once excessively improved, is eventually maintained near the initial inner-loop power control target value.

A change in the transmission power of the uplink low-rate channel transmitted by the radio communications device is illustrated in (D) of FIG. 14. The transmission power of the uplink low-rate channel begins ramping up the waiting time prior to the start of a communication through the uplink high-rate channel, and is once excessively increased, but subsequently is decreased and levels off at a fixed value. The increase in the transmission power of the uplink low-rate channel is attributable to the addition of the power control offset to the power control target value for the inner-loop power control at step S42 in FIG. 19 or FIG. 20. The reduction in the transmission power of the uplink low-rate channel is attributable to the start of the outer-loop power control at step S602 in FIG. 19 or FIG. 20.

As shown in FIG. 14, the reception quality of the uplink low-rate channel will not fall short of a required reception quality with the start of a communication through the uplink high-rate channel in the sixth embodiment as well.

In the sixth embodiment, the uplink high-rate channel control information may include information on a start timing of a communication through the uplink high-rate channel. In this alternative configuration, radio communications device 15 starts a communication through the uplink high-rate channel based on the information on the start timing which has been received as the uplink high-rate channel control information. Specifically, upon receipt of the information on the timing of starting a communication through the uplink high-rate channel through radio transceiver 40, control circuit 41 of radio communications device 15 starts a transmission through the uplink high-rate channel to radio base station 13 through radio transceiver 40 based on the received information on the start timing. In this event, step S602 can be omitted.

Also, in the sixth embodiment, the power control offset is not subtracted from the inner-loop power control target value, to which the power control offset has been added, after the start of a communication through the uplink high-rate channel. Alternatively, in the sixth embodiment, the power control offset can also be subtracted from the inner-loop power control target value, to which the power control offset has been added, after the start of a communication through the uplink high-rate channel, as is the case in the fifth embodiment.

Further, the sixth embodiment may employ radio base station 13 which is configured to notify radio base station 12 of information on the start of a communication through the uplink high-rate channel directly or through radio network controller 11. In this alternative configuration, radio base station 12 executes steps S42, S43, S600, S602 in FIG. 19 or FIG. 20. Also, by employing such a configuration, a communication through the uplink high-rate channel will less affect a communication through a communication channel of an adjacent radio base station.

The information on the start of a communication through the uplink high-rate channel may include at least one of a request for starting a communication through the uplink high-rate channel or a notice of the request for the start, the power control offset, a notice that the power control offset should be subtracted from the inner-loop power control target value, a notice that a communication through the uplink high-rate channel has been started, and a new power control target value.

At least one of the power control offset added to the inner-loop power control target value, and the new inner-loop power control target value may be generated by radio base station 12, or may be previously held in radio base station 12.

In each of the embodiments of the present invention described above, each of the power control offset and new inner-loop power control target value can be the same value for different radio communications devices or a different value for each of the radio communications devices.

Preferably, a radio communication system such as a mobile telephone communications system (PDC (Personal Digital Cellular) system, GSM (Global System for Mobile communications), CDMA (Code Division Multiple Access) system and the like), a wireless LAN (Local Area Network) communications system, and the like can be applied to the radio communications system in each of the embodiments of the present invention. In FIG. 2, the radio communications system comprises one radio network controller, two radio base stations, and two radio communications devices. However, the radio communications system according to the present invention can comprise two or more radio network controller, one or three or more radio base stations, and one or three or more radio communications devices.

Radio base stations of a variety of systems can be preferably used as the radio base stations in each of the embodiments described above, including a radio base station defined by IMT-2000 (International Mobile Telecommunications 2000) such as Node-B in the W-CDMA system, BS (Base Station) in the cdma2000 system and a base station system (BSS) in the GSM system, and a radio base station in the IS-95 system.

Radio network controllers of a variety of systems can be preferably used as the radio network controller in each of the embodiments described above, including a radio network control system defined by IMT-2000 (for example, RNC (Radio Network Controller) in the W-CDMA system, MSC (Mobile Switching center) in the cdma2000 system, and the like), a radio network controller (MSC: Mobile-service Switching Center) in the GSM system, a radio network controller in the IS-95 system, and the like.

Radio communications devices of a variety of systems can be preferably used as the radio communications devices in each of the embodiments described above, including a radio communications device defined by IMT-2000 (for example, UE (User Equipment) in the W-CDMA system, MS (Mobile Station) in the cdma2000 system), a radio communications device (MS (Mobile Station) in the GSM system), a radio communications device in the IS-95 system, and the like.

In each of the embodiments described above, DCH (Dedicated Channel), defined by 3GPP TS 25.211 V3.12.0, in the W-CDMA communications system can be preferably used for the uplink low-rate channel, while EUDCH (Enhanced Uplink DCH), defined by 3GPP TR 25.896 V6.0.0, can be preferably used for the uplink high-rate channel.

In each of the embodiments, the transmission power of the uplink high-rate channel is preferably larger than the transmission power of the uplink low-rate channel. In this event, as compared with the uplink high-rate channel having the transmission power equal to or smaller than the transmission power of the uplink low-rate channel, the reception quality of the uplink low-rate channel is more largely degraded by communications through the uplink high-rate channel. Therefore, remarkable effects can be produced by applying the present invention.

The W-CDMA communications system defined by IMT-2000, cdma200 communications system, or the uplink power control in a communication system defined by IS-95 (for example, 3GPP TS 25.214 V3.12.0) can be preferably applied to the inner-loop power control of the present invention. An outer-loop power control in the W-DCMA communications system defined by IMT-2000, cdma2000 communications system, or IS-95 can be preferably applied to the outer-loop power control in the present invention.

In each of the embodiments, the information on a start request may include the start request itself. Specifically, a start request transmitted by radio communications device may pass through radio base station 13 as it is and be received as it is by radio network controller 11.

In each of the embodiment, the waiting time information may be generated based on the speed of the inner-loop power control, and the power control offset. For example, a time required to improve the reception quality by a power control offset may be found based on the control speed of the inner-loop power control, and the required time or a time longer than the required time may be set to the waiting time. The waiting time information may be previously determined and held in radio network controller 11 or radio base station 13.

The reception quality of the uplink low-rate channel and the inner-loop power control target value in each of the embodiments can be preferably represented by a signal-to-interference ratio (SIR), a signal to interference ratio per bit (Eb/No), or the like. The communication quality of the uplink low-rate channel, and the outer-loop power control target value in each of the embodiments can be preferably represented by a bit error rate, a frame error rate, a block error rate, CRC (Cyclic Redundancy Code), or the like.

Preferably, the uplink high-rate channel control information in each of the embodiments can include at least one of maximum transmission power, transmission timing, spread code, and data rate.

In each of the embodiments described above, a communication through the uplink high-rate channel is continuously made once it is started. Alternatively, a communication through the uplink high-rate channel may be intermittently started or repeatedly started and stopped.

As shown in FIGS. 8, 11, and 14, in each of the embodiments, the power control offset is consistent with the amount of degradation in the reception quality of the low-rate channel caused by the start of a communication through the uplink high-rate channel. However, they need not be necessarily consistent with each other. For example, the power control offset can be made larger than the amount of degradation in the reception quality, as a matter of course, and can be made smaller than the amount of degradation in the reception quality as well. When the power control offset is made smaller than the amount of degradation in the reception quality, a communication through the uplink low-rate channel can be less affected by the degradation in the reception quality of the uplink low-rate channel caused by a communication through the uplink high-rate channel, provided that the reception quality of the low-rate channel has been improved beyond the initial power control target at the start of the communication through the uplink high-rate channel.

As shown in FIG. 11, in the second, third, fifth, and sixth embodiments, the timing at which the communication through the uplink high-rate channel is started is substantially coincident with the timing at which the power control offset is subtracted. However, these timings need not necessarily be coincident or substantially coincident. For example, the timing at which the power control offset is subtracted can be set after the start timing of the communication through the uplink high-rate channel, as a matter of course, and can also be set before the timing at which the communication through the uplink high-rate channel is started. Even when the timing at which the power control offset is subtracted is set before the timing of the start of the communication through the uplink high-rate channel, a communication through the uplink low-rate channel can be less affected by the degradation in the reception quality of the uplink low-rate channel caused by the communication through the uplink high-rate channel, provided that the reception quality of the uplink low-rate channel has been improved beyond the initial power control target at the timing at which the communication through the uplink high-rate channel is started.

As shown in FIG. 14, in the third and sixth embodiments, the timing at which the outer-loop power control is started is set after the timing at which a communication through the uplink high-rate channel is started, but the timing at which the outer-loop power control is started need not be necessarily set after the timing of the start of the communication through the uplink high-rate channel. For example, the timing at which the outer-loop power control is started can be made coincident with the timing at which the communication through the uplink high-rate channel is started, or set before the timing of the start of the communication through the uplink high-rate channel. Even in such a scenario, a communication through the uplink low-rate channel can be less affected by the degradation in the reception quality of the uplink low-rate channel caused by the communication through the uplink high-rate channel, provided that the reception quality of the uplink low-rate channel has been improved beyond the initial power control target at the timing at which the communication through the uplink high-rate channel is started. Also, in the third and sixth embodiments, the control step of the outer-loop power control is the same or substantially the same as the power control offset, but they need not be necessarily the same. Even if the control step of the outer-loop power control is larger than the power control offset, a communication through the uplink low-rate channel can be less affected by the degradation in the reception quality of the uplink low-rate channel caused by the communication through the uplink high-rate channel, provided that the reception quality of the uplink low-rate channel has been improved beyond the initial power control target at the timing at which the communication through the uplink high-rate channel is started.

The power control offset relating to the uplink low-rate channel transmitted by radio communications device 15 can be generated in consideration of at least one of the following conditions in each of the embodiments of the present invention:

(i) The amount of increase in interfering power due to the uplink high-rate channel;

(ii) An increase in reception power of the uplink low-rate channel transmitted by the radio communications device itself, caused by adding the power control offset to the inner-loop power control target value;

(iii) The amount of increase in interfering power due to the uplink low-rate channel transmitted by a different radio communications device from radio communications device 15, when the power control offset is added to the inner-loop power control target value associated with the different radio communications device from radio communications device 15; and (iv) The number of radio communications devices connected to a radio base station.

Also, preferably, the power control offset may be generated based on QoS (Quality of Service) provided by the communication through the uplink low-rate channel. Further, the power control offset may be generated by selecting one from options stored in a previously prepared table.

Preferably, the power control offset can be generated by a method as described below. However, the following method is an example of a power control offset generating method, and the present invention is not limited to the employment of this method.

Assume that there are a first and a second radio communications device in a radio communications system. A power control offset is found for the inner-loop power control in regard to the second radio communications device which initiates a transmission through the uplink high-rate channel in consideration of the existence of the first ratio communications device. The power control offsets associated with the first and second radio communications devices are designated by $\Delta S_1$ and $\Delta S_2$, respectively. For an uplink low-rate channel transmitted by the first radio communications device, the reception quality is represented by $S_1(X_1, Y_1, Y)$; received power by $C_1$ before the power control offset is added to an inner-loop power control target value; and the amount of increase in the received power resulting from the addition of the power control offset by $\Delta C_1$. For an uplink low-rate channel transmitted by the second communications device, the reception quality is represented by $S_2(X_2, Y_2, Y)$; received power by $C_2$ before the power control offset is added to an inner-loop power control target value; and the amount of increase in the received power resulting from the addition of the power control offset by $\Delta C_2$. Received power of the uplink high-rate channel transmitted by the second radio communications device is represented by $C_{eu}$. Further, Gaussian noise is represented by N. $X_1$, $X_2$, and Y are variables which represent the received power of the uplink low-rate channel transmitted by the first radio communications device, received power of the uplink low-rate channel transmitted by the second radio communications device, and received power of the uplink high-rate channel. Here, $\Delta C_1$ and $\Delta C_2$ are unknown values, while other parameters are known values.

After the lapse of a sufficient time from the addition of the power control offset to the inner-loop power control target value, the received power of the uplink low-rate channels transmitted by the first and second radio communications devices are represented by $\Delta C_1 + \Delta_1$ and $\Delta C_2 + \Delta C_2$, respectively. Assume herein that the power control offset is equal to the amount of degradation in the reception quality caused by the start of a communication through the uplink high-rate channel. In this event, the reception qualities $S_1(C_1, C_2, 0)$ and $S_2(C_1, C_2, 0)$ before the addition of the power control offset (i.e., before the start of the transmission through the uplink high-rate channel) are equal to the reception qualities $S_1(C_1+\Delta C_1, C_2+\Delta C_2, C_{eu})$ and $S_2(C_1+\Delta C_1, C_2+\Delta C_2, C_{eu})$, respectively, immediately after the start of the communication through the uplink high-rate channel after a sufficient time has elapsed from the addition of the power control offset to the inner-loop power control target value. In other words, the following equations (1) and (2) are established:

$$S_1(C_1,C_2,0)=S_1(C_1+\Delta C_1,C_2+\Delta C_2,C_{eu}) \tag{1}$$

$$S_2(C_1,C_2,0)=S_2(C_1+\Delta C_1,C_2+\Delta C_2,C_{eu}) \tag{2}$$

Unknown values $\Delta C_1$ and $\Delta C_2$ can be calculated from Equations (1) and (2). Therefore, the power control offset can be calculated by subtracting the reception quality before the power control offset is added (i.e., before the start of a communication through the uplink high-rate channel) from the reception quality at the time a sufficient time has elapsed from the addition of the power control offset and before the start of a communication through the uplink high-rate channel. Specifically, the power control offsets can be calculated for the first and second radio communications devices, as expressed by the following equations (3) and (4):

$$\Delta S = S_1(C_1+\Delta C_1,C_2+\Delta C_2,0)-S_1(C_1,C_2,0) \tag{3}$$

$$\Delta S = S_2(C_1+\Delta C_1,C_2+\Delta C_2,0)-S_2(C_1,C_2,0) \tag{4}$$

Equations (1) to (4) are applied when there are two radio communications devices. When there are m radio communications devices, a power control offset $\Delta S_k$ can be calculated for a $k^{th}$ radio communications device by solving the following equations (5), (6):

$$S_k(C_1,C_2,\ldots,C_m,0)=S_k(C_1+\Delta C_1,C_2+\Delta C_2,\ldots,C_m+\Delta C_m,Ceu)(k=1,2,\ldots,m) \tag{5}$$

$$\Delta S_k = S_k(C_1+\Delta C_1,C_2+\Delta C_2,\ldots,C_m+\Delta C_m,0)-S_k(C_1,C_2,\ldots,C_m,0)(k=1,2,\ldots,m) \tag{6}$$

For example, function $S_k$ can be expressed by Equation (7):

$$S_k = \frac{X_k}{\left(N+\sum_{i \neq k} \frac{X_i + C_{eu}}{SF}\right)} \tag{7}$$

where $S_k$ and $X_k$ represent the received power and reception quality, respectively, of an uplink low-rate channel transmitted by a $k^{th}$ radio communications device. Parameter SF represents a known spreading factor, and SF may take a different value for each radio communications device.

What is claimed is:

1. A radio base station installed in a radio communications system which includes a radio network controller and a radio communications device, said radio base station comprising:
    transmission/reception means for communicating with said radio network controller;
    radio transceiver means for communicating with said radio communications device to receive a first communication channel and a second communication channel from said radio communications device; and
    control means for detecting a reception quality of the first communication channel, conducting an inner-loop power control for controlling transmission power of the first communication channel from said radio communications device based on the reception quality and an inner-loop power control target value, and adding a power control offset to the inner-loop power control target value before said radio transceiver means starts a communication through the second communication channel,
    wherein said control means conducts an outer-loop power control for adjusting the inner-loop power control target value between said radio base station and said radio network controller through said radio transceiver means, interrupts the outer-loop power control after the power control offset is added to the inner-loop power control target value, and resumes the outer-loop power control from start of a communication through the second communication channel onward after the outer-loop power control was interrupted.

2. The radio base station according to claim 1, wherein said transmission/reception means receives the power control offset from said radio network controller.

3. The radio base station according to claim 1, wherein said control means generates the power control offset.

4. The radio base station according to claim 3, wherein said power control offset is generated based on at least one of the number of radio communications devices connected to said radio base station, an increase in interference caused by the start of a communication through the second communication channel, an increase in transmission power of said radio communications device, an increase in interference caused by an increase in transmission power of a radio communications device other than said radio communication device, and QoS of a communication through the first communication channel.

5. The radio base station according to claim 1, wherein said control means subtracts the power control offset from the inner-loop power control target value to which the power control offset has been added, after the start of the communication through the second communication channel.

6. The radio base station according to claim 1, wherein said radio transceiver means starts a communication through the second communication channel after lapse of a waiting time after said control means adds the power control offset to the inner-loop power control target value.

7. The radio base station according to claim 6, wherein said radio transceiver means receives information on the waiting time from said radio network controller.

8. The radio base station according to claim 6, wherein said control means generates information on the waiting time.

9. The radio base station according to claim 8, wherein said control means generates the information on the waiting time based on speed of the inner-loop power control, and the power control offset.

10. The radio base station according to claim 1, wherein said radio transceiver means starts the communication through the second communication channel by transmitting second communication channel control information to said radio communications device.

11. The radio base station according to claim 10, wherein said radio transceiver means receives the second communication channel information from said radio network controller.

12. The radio base station according to claim 10, wherein said second communication channel information includes at least one of maximum transmission power, transmission timing, spread code, and data rate.

13. The radio base station according to claim 1, wherein said radio transceiver means starts the communication through the second communication channel by transmitting second communication channel control information to said radio communications device prior to the start of the communication through the second communication channel, and transmitting a start permission notice of the second communication channel communication to said radio communications device.

14. The radio base station according to claim 1, wherein said inner-loop power control target value is one of a signal-to-interference ratio, and a signal-to-interference ratio per bit.

15. The radio base station according to claim 1, wherein said second communication channel has a data rate higher than that of said first communication channel, and said second communication channel has larger transmission power than the transmission power of said first communication channel.

16. A radio base station installed in a radio communications system which includes a radio network controller and a radio communications device, said radio base station comprising:
    transmission/reception means for communicating with said radio network controller;
    radio transceiver means for communicating with said radio communications device to receive a first communication channel and a second communication channel from said radio communications device; and
    control means for detecting a reception quality of the first communication channel, conducting an inner-loop power control for controlling transmission power of the first communication channel from said radio communications device based on the reception quality and an inner-loop power control target value, and adding a power control offset to the inner-loop power control target value before said radio transceiver means starts a communication through the second communication channel,
    wherein:
    said radio communications system comprises a second radio base station different from said radio base station, and
    said control means transmits information on the start of a communication through the second communication channel to said second radio base station directly or through said radio network controller.

17. A radio network controller installed in a radio communications system which includes a radio base station, and a radio communications device for making a communication by transmitting a first and a second communication channel to said radio base station, said radio network controller comprising:
    transmission/reception means for communicating with said radio base station; and
    control means for recognizing a request for starting a communication through the second communication channel, and notifying said radio base station of a power control offset through said transmission/reception means,
    wherein said power control offset is added to a control target value for an inner-loop power control in regard to the first communication channel between said radio base station and said radio communications device,
    wherein:
    said radio communications system includes a second radio base station different from said radio base station, and
    said control means transmits information on the start of the communication through the second communication channel to said second radio base station.

18. The radio network controller according to claim 17, wherein said inner-loop power control involves controlling transmission power of the first communication channel in said radio communications device based on a reception quality of the first communication channel transmitted by said radio communications device at said radio base station, and the control target value.

19. The radio network controller according to claim 17, wherein said transmission/reception means notifies said radio base station of information on a waiting time, said waiting time being a time interval from the addition of the power control offset to the control target value to the start of the communication through the second communication channel.

20. The radio network controller according to claim 19, wherein said control means generates the information on the waiting time based on the speed of the inner-loop power control, and the power control offset.

21. The radio network controller according to claim 17, wherein said power control offset is generated based on at least one of the number of radio communications devices connected to said radio base station, an increase in interference caused by the start of the communication through the second communication channel, an increase in transmission power of said radio communications device, an increase in interference caused by an increase in transmission power of a radio communications device other than said radio communication device, and QoS of a communication through the first communication channel.

22. A radio network controller installed in a radio communications system which includes a radio base station, and a radio communications device for making a communication by transmitting a first and a second communication channel to said radio base station, said radio network controller comprising:
    transmission/reception means for communicating with said radio base station; and
    control means for conducting an outer-loop power control between said control means and said radio base station through said transmission/reception means for adjusting a control target value for an inner-loop power control conducted in regard to the first communication channel between said radio communications device and said radio base station, interrupting the outer-loop power control after recognizing a request for starting a communication through the second communication channel, and resuming the outer-loop power control after recognizing the start of the communication through the second communication channel.

23. The radio network controller according to claim 22, wherein said control means recognizes the start of the communication through the second communication channel by receiving a notice that the communication has been started through the second communication channel.

24. The radio network controller according to claim 22, wherein a power control offset is added to the control target value before the start of the communication through the second communication channel.

25. The radio network controller according to claim 22, wherein:
said communication through the second communication channel is started after lapse of a waiting time from the addition of the power control offset to the power control target value,
said transmission/reception means receives a notice on the waiting time from said radio base station, and
said control means interrupts the outer-loop power control, and thereafter resumes the outer-loop control after lapse of a time in accordance with the information on the waiting time.

26. The radio network controller according to claim 22, wherein said control means recognizes a request for starting the communication through the second communication channel by receiving the request for starting the communication through the second communication channel.

27. The radio network controller according to claim 22, wherein said control unit recognizes a request for starting the communication through the second communication channel by receiving the request for starting the communication through the second communication channel.

28. A radio communications system comprising a radio network controller, a radio base station, and a radio communications device, wherein:
said radio base station comprises:
base station transmission/reception means for communicating with said radio network controller;
base station radio transceiver means for communicating with said radio communications means to receive a first communication channel and a second communication channel from said radio communications device; and
base station control means for detecting a reception quality of the first communication channel, conducting an inner-loop power control for controlling transmission power of the first communication channel from said radio communications device based on the reception quality and an inner-loop power control target value, and adding a power control offset to the inner-loop power control target value before said base station radio transceiver means starts a communication through the second communication channel,
said network controller comprises:
controller transmission/reception means for communicating with said radio base station; and
controller control means for conducting an outer-loop power control between said network controller and said radio base station through said controller transmission/reception means for adjusting an inner-loop power control target value for the inner-loop power control conducted in regard to the first communication channel between said radio communications device and said radio base station, interrupting the outer-loop power control after recognizing a request for starting a communication through the second communication channel, and resuming the outer-loop power control after recognizing the start of the communication through the second communication channel, and
said radio communications device comprises:
radio communications device transceiver means for transmitting the first communication channel and the second communication channel to said radio base station; and
radio communications device control means for conducting the inner-loop power control between said radio communications means and said radio base station through said radio communications device transceiver means, and starting a transmission of the second communication channel through said radio communications device transceiver means after the power control offset is added to the inner-loop power control target value for the inner-loop power control.

29. A method of controlling a radio communications system which includes a radio base station, a radio communications device for making a communication by transmitting a first and a second communication channel to said radio base station, and a radio network controller, said method comprising the steps of:
conducting an outer-loop power control between said radio network controller and said radio base station for adjusting a control target value for an inner-loop power control conducted in regard to the first communication channel between said radio communications device and said radio base station;
interrupting the outer-loop power control after recognizing a request for starting a communication through the second communication channel in said radio network controller; and
resuming the outer-loop power control after recognizing the start of a communication through the second communication channel in said radio network controller.

30. A method of controlling a radio communications system which includes a radio network controller, a radio base station, and a radio communications device, said method comprising the steps of:
transmitting a first communication channel from said radio communications device to said radio base station;
detecting a reception quality of the first communication channel at said radio base station;
conducting an inner-loop power control between said radio communications device and said radio base station for controlling transmission power of the first communication channel from said radio communications device based on the reception quality and an inner-loop power control target value;
conducting an outer-loop power control between said radio network controller and said radio base station for adjusting the inner-loop power control target value;
interrupting the outer-loop power control after recognizing a request for starting a communication through the second communication channel in said radio base station;
adding a power control offset to the inner-loop power control target value;
resuming the outer-loop power control after recognizing the start of a communication through the second communication channel in said radio base station; and starting a transmission of the second communication channel in said radio communications device after the power control offset is added to the inner-loop power control target value.

31. A radio base station installed in a radio communications system which includes a radio network controller and a radio communications device, said radio base station comprising:
   a transmission/reception unit configured to communicate with said radio network controller;
   a radio transceiver unit configured to communicate with said radio communications device to receive a first communication channel and a second communication channel from said radio communications device; and
   a control unit configured to detect a reception quality of the first communication channel, conducting an inner-loop power control for controlling transmission power of the first communication channel from said radio communications device based on the reception quality and an inner-loop power control target value, and adding a power control offset to the inner-loop power control target value before said radio transceiver unit starts a communication through the second communication channel,
   wherein said control unit conducts an outer-loop power control for adjusting the inner-loop power control target value between said radio base station and said radio network controller through said radio transceiver unit, interrupts the outer-loop power control after the power control offset is added to the inner-loop power control target value, and resumes the outer-loop power control from start of a communication through the second communication channel onward after the outer-loop power control was interrupted.

32. A radio network controller installed in a radio communications system which includes a radio base station, and a radio communications device for making a communication by transmitting a first and a second communication channel to said radio base station, said radio network controller comprising:
   a transmission/reception unit configured to communicate with said radio base station; and
   a control unit configured to recognize a request for starting a communication through the second communication channel, and notifying said radio base station of a power control offset through said transmission/reception unit,
   wherein said power control offset is added to a control target value for an inner-loop power control in regard to the first communication channel between said radio base station and said radio communications device,
   wherein:
   said radio communications system includes a second radio base station different from said radio base station, and
   said control unit transmits information on the start of the communication through the second communication channel to said second radio base station.

33. A radio network controller installed in a radio communications system which includes a radio base station, and a radio communications device for making a communication by transmitting a first and a second communication channel to said radio base station, said radio network controller comprising:
   a transmission/reception unit configured to communicate with said radio base station; and
   a control unit configured to conduct an outer-loop power control between said control unit and said radio base station through said transmission/reception unit to adjust a control target value for an inner-loop power control conducted in regard to the first communication channel between said radio communications device and said radio base station, interrupt the outer-loop power control after recognizing a request for starting a communication through the second communication channel, and resume the outer-loop power control after recognizing the start of the communication through the second communication channel.

34. The radio network controller according to claim 33, wherein said control unit recognizes the start of the communication through the second communication channel by receiving a notice that the communication has been started through the second communication channel.

35. The radio network controller according to claim 33, wherein a power control offset is added to the control target value before the start of the communication through the second communication channel.

36. The radio network controller according to claim 33, wherein:
   said communication through the second communication channel is started after lapse of a waiting time from the addition of the power control offset to the power control target value,
   said transmission/reception unit receives a notice on the waiting time from said radio base station, and
   said control unit interrupts the outer-loop power control, and thereafter resumes the outer-loop control after lapse of a time in accordance with the information on the waiting time.

37. A radio communications system comprising a radio network controller, a radio base station, and a radio communications device, wherein:
   said radio base station comprises:
      a base station transmission/reception unit configured to communicate with said radio network controller;
      a base station radio transceiver unit configured to communicate with said radio communications unit to receive a first communication channel and a second communication channel from said radio communications device; and
      a base station control unit configured to detect a reception quality of the first communication channel, conduct an inner-loop power control for controlling transmission power of the first communication channel from said radio communications device based on the reception quality and an inner-loop power control target value, and add a power control offset to the inner-loop power control target value before said base station radio transceiver means starts a communication through the second communication channel
   said network controller comprises:
      a controller transmission/reception unit configured to communicate with said radio base station; and
      a controller control unit configured to conduct an outer-loop power control between said network controller and said radio base station through said controller transmission/reception unit to adjust an inner-loop power control target value for the inner-loop power control conducted in regard to the first communication channel between said radio communications device and said radio base station, interrupt the outer-loop power control after recognizing a request for starting a communication through the second communication channel, and resume the outer-loop power control after recognizing the start of the communication through the second communication channel, and said radio communications device comprises:
- a radio communications device transceiver unit configured to transmit the first communication channel and the second communication channel to said radio base station; and
- a radio communications device control unit configured to conduct the inner-loop power control between said radio communications unit and said radio base station through said radio communications device transceiver unit, and start a transmission of the second communication channel through said radio communications device transceiver unit after the power control offset is added to the inner-loop power control target value for the inner-loop power control.

* * * * *